(12) United States Patent
Sidelnik

(10) Patent No.: US 12,436,530 B2
(45) Date of Patent: Oct. 7, 2025

(54) LATENCY MANAGEMENT SYSTEMS AND METHODS FOR REMOTE CONTROL OF A ROBOTIC DEVICE

(71) Applicant: Verizon Patent and Licensing Inc., Basking Ridge, NJ (US)

(72) Inventor: Nicholas Sidelnik, Lake Quivira, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 520 days.

(21) Appl. No.: 17/942,869

(22) Filed: Sep. 12, 2022

(65) Prior Publication Data

US 2024/0085901 A1 Mar. 14, 2024

(51) Int. Cl.
*G06K 9/00* (2022.01)
*G05D 1/00* (2006.01)
*G06V 10/70* (2022.01)
*G06V 20/40* (2022.01)

(52) U.S. Cl.
CPC ......... *G05D 1/0022* (2013.01); *G05D 1/0038* (2013.01); *G06V 10/70* (2022.01); *G06V 20/46* (2022.01)

(58) Field of Classification Search
CPC .... G05D 1/0022; G05D 1/0038; G06V 20/46; G06V 10/70
See application file for complete search history.

(56) References Cited

U.S. PATENT DOCUMENTS

| | | | |
|---|---|---|---|
| 10,200,574 B2 * | 2/2019 | Chou | G06T 5/77 |
| 2014/0032013 A1 * | 1/2014 | Riley | G05D 1/0038 |
| | | | 701/2 |
| 2019/0058853 A1 * | 2/2019 | Brudnak | H04N 7/185 |
| 2020/0041995 A1 * | 2/2020 | Quillin | G05D 1/0088 |
| 2020/0081431 A1 * | 3/2020 | Weiss | G05D 1/224 |
| 2020/0310416 A1 * | 10/2020 | Matsunaga | G06F 3/147 |
| 2023/0165643 A1 * | 6/2023 | Jin | A61B 34/10 |
| | | | 382/128 |

OTHER PUBLICATIONS

Zhou, et al., "Deep Learning in Next-Frame Prediction: A Benchmark Review", DOI 10.1109/ACCESS.2020.2987281. Version published Apr. 23, 2020. IEEE Access vol. 8, 2020. pp. 69273-69283.

* cited by examiner

*Primary Examiner* — Avinash Yentrapati

(57) ABSTRACT

An illustrative latency management system receives a sequence of captured frames in a video stream of an operating environment associated with a robotic device. The latency management system monitors a communication latency of a communication channel between the robotic device and a robotic device operator. The latency management system predicts one or more estimated future frames associated with the video stream based on the sequence of captured frames and the communication latency. The latency management system provides the one or more estimated future frames to the robotic device operator. Corresponding methods and systems are also disclosed.

19 Claims, 8 Drawing Sheets

LATENCY MANAGEMENT SYSTEMS AND METHODS FOR REMOTE CONTROL OF A ROBOTIC DEVICE

BACKGROUND INFORMATION

A robot may be controlled by a robot operator to perform a task (e.g., catching a moving ball). In some robotic systems, the robot operator may be located remotely from the robot. Accordingly, the robot may capture a video stream of its surrounding environment and transmit the video stream to the robot operator via a network. Based on the video stream, the robot operator may initiate a command instructing the robot to perform an action according to the surrounding environment of the robot as depicted in the video stream and transmit the command to the robot via the network. Upon receiving the command from the robot operator, the robot may perform the action specified in the command to carry out the task.

BRIEF DESCRIPTION OF THE DRAWINGS

The accompanying drawings illustrate various embodiments and are a part of the specification. The illustrated embodiments are merely examples and do not limit the scope of the disclosure, Throughout the drawings, identical or similar reference numbers designate identical or similar elements.

DETAILED DESCRIPTION OF EXAMPLE EMBODIMENTS

Systems and methods for managing latency to remotely control a robotic device are described herein. In some embodiments, a robotic device may be a machine (e.g., a delivery robot) or a portion of a machine (e.g., a robotic arm) that operates under control of a robotic device operator to perform a task. For example, the robotic device operator may control the robotic device (e.g., the delivery robot) to cross a street to deliver an item. As another example, the robotic device operator may control the robotic device (e.g., the robotic arm) to catch a moving object. Thus, the robotic device operator may control the robotic device to operate in different operating environments (e.g., in a warehouse, in a manufacturing plant, at a retail store, at a medical facility, etc.) to perform various relevant tasks.

Figure 8:
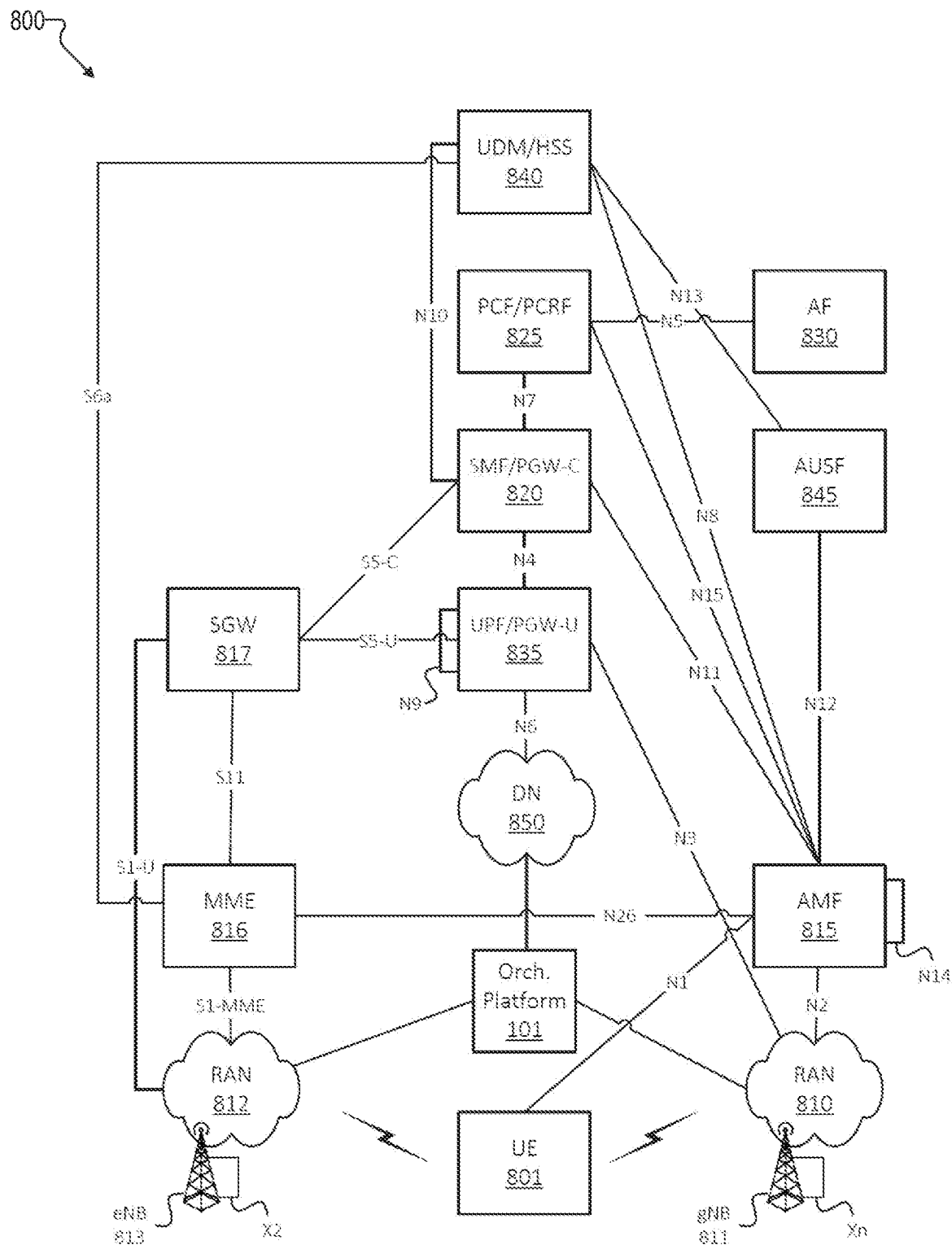
FIG. 8 shows an illustrative network environment according to embodiments described herein.

In some embodiments, the robotic device and the robotic device operator may be located at different locations and may communicate with one another via a communication channel (e.g., a wireless communication channel, a channel over a network such as a network depicted in FIG. 8, or a channel over any other suitable communication medium). Accordingly, the robotic device operator may control the robotic device remotely by way of communications over the communication channel.

In some embodiments, a camera may be provided to capture a video stream of an operating environment associated with the robotic device and the video stream may be transmitted to the robotic device operator via the communication channel. Based on one or more captured frames in the video stream that depict the operating environment of the robotic device, the robotic device operator may generate a control input and transmit the control input to the robotic device via the network. Additionally or alternatively, the robotic device operator may present one or more captured frames in the video stream to a user, obtain a control input that the user provides based on the one or more captured frames, and transmit the control input to the robotic device via the communication channel. The robotic device may receive the control input from the robotic device operator and carry out an action specified by the control input to perform the task.

However, due to latency in transmitting data over the communication channel, such as a channel over a network, a captured frame may arrive at the robotic device operator with delay. For example, the captured frame may be captured at a first timestamp and may depict a context in the operating environment of the robotic device at the first timestamp. Due to the communication latency in transmitting the captured frame from the robotic device to the robotic device operator, the captured frame may arrive at the robotic device operator at a second timestamp subsequent to the first timestamp. Accordingly, when the captured frame is used at the robotic device operator to determine a control input for the robotic device, the context in the operating environment of the robotic device at the first timestamp may already be a context in the past. Thus, the control input may be based on a past context in the operating environment of the robotic device at the first timestamp while such a context (e.g., locations of vehicles on the street, a position of the moving object relative to the ground) may have changed after the first timestamp.

In addition, the transmission of the control input from the robotic device operator to the robotic device may also be subjected to latency and therefore the control input may also arrive at the robotic device with delay. For example, the control input may arrive at the robotic device at a third timestamp subsequent to the second timestamp and the first timestamp. Accordingly, the robotic device may be controlled with the control input that is based on the past context in the operating environment of the robotic device at the first timestamp and not based on a current context in the operating environment of the robotic device when the robotic device receives the control input at the third timestamp. As a result, for certain applications and/or use cases of the robotic device, the control input may not be suitable for the current context in the operating environment of the robotic device at the third timestamp, and therefore the control input may result in the task being performed unsuccessfully, being performed with a low level of accuracy, and/or an incorrect task being performed.

Systems and methods described herein are capable of managing latency to control a robotic device remotely. For example, in some embodiments, the systems and methods may receive one or more captured frames as a stream (e.g. a video stream) of an operating environment of a robotic device via a communication channel, such as a channel over a network. The captured frames in the video stream may be captured by a camera integrated into the robotic device and/or positioned relative to the robotic device to monitor the operating environment of the robotic device. In some embodiments, the systems and methods may also monitor a latency (e.g., a communication latency) of the communication channel between the robotic device and a robotic device operator that controls the robotic device remotely. In some embodiments, the communication channel may be a channel over a network, and thus the communication latency may be a network latency such as a two-way network latency that includes a first latency for transmitting data (e.g., captured frames) from the robotic device to the robotic device operator and a second latency for transmitting data (e.g., control inputs) from the robotic device operator to the robotic device through the communication channel therebetween.

In some embodiments, the systems and methods may predict one or more estimated future frames associated with the video stream of the operating environment of the robotic device. For example, the systems and methods may determine a target future timestamp based on the latency and an estimated processing time for predicting one or more estimated future frames in the video stream. The systems and methods may then generate the one or more estimated future frames associated with the video stream based on the target future timestamp. For example, the systems and methods may predict the one or more estimated future frames from one or more captured frames in the video stream using a machine learning model. The one or more estimated future frames may depict one or more predicted future contexts in the operating environment of the robotic device at one or more future timestamps up to the target future timestamp. Accordingly, the systems and methods may predict the future contexts in the operating environment of the robotic device as far into the future as the target future timestamp.

In some embodiments, the systems and methods may provide the one or more estimated future frames to the robotic device operator. The robotic device operator may determine a control input (e.g., generate a control input and/or obtain a control input from a user) using an estimated future frame among the one or more estimated future frames and transmit the control input to the robotic device via the network. When receiving the control input from the robotic device operator, the robotic device may perform an action specified in the control input to carry out a task in the operating environment of the robotic device.

Systems and methods described herein may be advantageous in a number of technical respects. For example, as described above, the systems and methods may generate one or more estimated future frames that depict one or more predicted future contexts in the operating environment of the robotic device at one or more future timestamps up to the target future timestamp. As described above, the target future timestamp may be determined based on the two-way latency for transmitting data between the robotic device and the robotic device operator and also based on the estimated processing time for predicting the one or more estimated future frames from one or more captured frames. Accordingly, by predicting the estimated future frames that depict the future contexts in the operating environment of the robotic device as far into the future as the target future timestamp, the systems and methods may predict the future contexts in the operating environment of the robotic device far enough into the future to compensate for one or more of 1) a first time amount to receive the one or more captured frames from the robotic device, 2) a second time amount for predicting the one or more estimated future frames from the one or more captured frames, and 3) a third time amount for a control input based on an estimated future frame among the one or more estimated future frames to arrive at the robotic device.

Accordingly, when determining a control input for the robotic device, the systems and methods may identify, from the one or more estimated future frames that are predicted, an estimated future frame that depicts a predicted future context in the operating environment of the robotic device at the time the control input would arrive at the robotic device. The systems and methods may then use the estimated future frame to determine the control input. As a result, the control input may be suitable for the future context in the operating environment of the robotic device at the time the robotic device would receive the control input and perform the action specified by the control input, and thus the systems and methods may improve the level of accuracy in controlling the robotic device. In addition, as the estimated future frames that account for the communication latency (e.g., the network latency) are provided to the robotic device operator to determine the control inputs for the robotic device, operations of the robotic device operator in controlling the robotic device may be simplified and facilitated.

The systems and methods may be implemented at the robotic device, the robotic device operator, and/or an intermediate computing device such as a multi-access edge computing (MEC) device (e.g., a MEC device depicted in FIG. 9) that data passes through during its transmission from the robotic device to the robotic device operator. Thus, the systems and methods may be implemented on one or more devices that participate in data transmission from the robotic device to the robotic device operator. As a result, the systems and methods may avoid communicating with a device not included in the communication channel between the robotic device and the robotic device operator, and therefore avoid introducing additional communication latency to the data transmission. Accordingly, the systems and methods may avoid extending the target future timestamp farther into the future to compensate for the additional communication latency, which may result in the future frame prediction being more complicated and less accurate.

Various illustrative embodiments will now be described in detail with reference to the figures. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below. For example, systems and methods described herein may facilitate a robotic device operator in controlling a robotic device remotely. As a result, the amounts of various resources (e.g., processing resources such as a number of computing cycles, network resources such as an amount of network bandwidth, storage resources such as an amount of storage memory, etc.) being consumed by the robotic device operator and/or the robotic device in that process may be reduced. The performance of the robotic device operator and/or the robotic device may also be improved.

Figure 1:
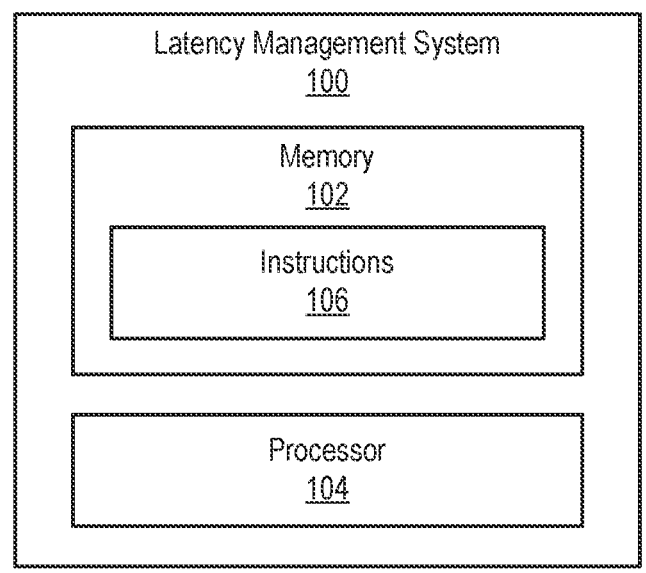
FIG. 1 shows an illustrative latency management system according to embodiments described herein.

FIG. 1 shows an illustrative latency management system 100 for managing latency to control a robotic device remotely. As depicted in FIG. 1, latency management system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within latency management system 100. In some examples, memory 102 and processor 104 may be distributed between multiple components, multiple devices, and/or multiple locations as may serve a particular implementation.

Memory 102 may store and/or otherwise maintain executable data used by processor 104 to perform any of the functionality described herein. For example, memory 102 may store instructions 106 that may be executed by processor 104. Additionally, memory 102 may also maintain any other data accessed, managed, used, and/or transmitted by processor 104 in a particular implementation. Memory 102 may be implemented by one or more memory or storage devices, including any memory or storage devices described herein, that are configured to store data in a transitory or non-transitory manner.

Instructions 106 may be executed by processor 104 to cause latency management system 100 to perform any of the functionality described herein. For example, instructions 106 may include a latency management application configured to perform any of the functionality described herein. Instructions 106 may be implemented by any suitable application, software, code, and/or other executable data instance(s).

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), latency management system 100 may perform various functions associated with managing latency to control a robotic device remotely in any manner described herein or as may serve a particular implementation.

Figure 2:
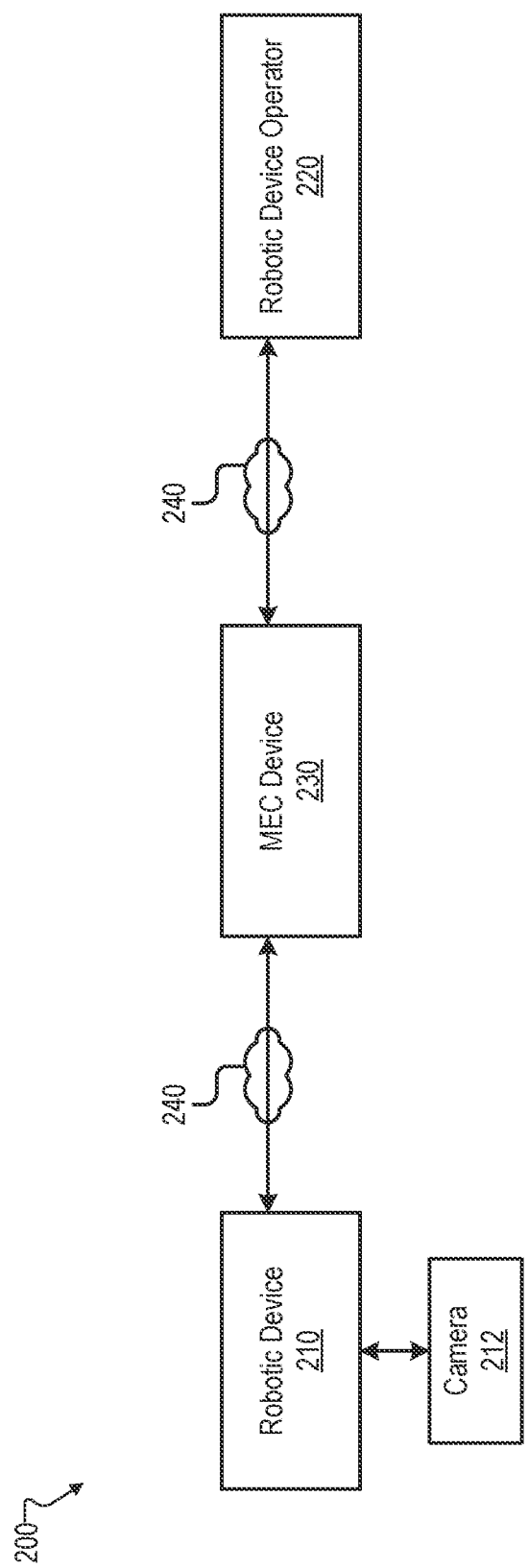
FIG. 2 shows an illustrative system in which a latency management system may be implemented according to embodiments described herein.

FIG. 2 shows an illustrative system 200 in which latency management system 100 may be implemented. As depicted in FIG. 2, system 200 may include a robotic device 210 associated with a camera 212, a robotic device operator 220, and a multi-access edge computing (MEC) device 230. In some embodiments, robotic device 210, robotic device operator 220, and/or MEC device 230 may be communicatively coupled to one another via a network 240.

Robotic device 210 may be a machine (e.g., a delivery robot, a warehouse robot, etc.) or a portion of a machine (e.g., a robotic arm of a manufacturing equipment) that is capable of performing one or more actions (e.g., by actuating/moving one or more actuators or other components of the machine) to carry out a task. To successfully carry out the task, robotic device 210 may perform an action at a particular time within a context in an operating environment of robotic device 210 at the particular time. In some embodiments, the context may indicate states and/or positions of various objects in the operating environment of robotic device 210 at the particular time. For example, robotic device 210 may be a delivery robot performing a task of crossing a street to deliver an item and the context may indicate locations of vehicles on the street at the particular time. As another example, robotic device 210 may be a robotic arm performing a task of grabbing an item on a conveyor belt and the context may indicate positions of items on the conveyor belt at the particular time.

In some embodiments, robotic device 210 may operate under control of robotic device operator 220 to carry out the task. For example, robotic device operator 220 may provide one or more control inputs to robotic device 210 to control robotic device 210. The robotic device 210 may receive a control input from robotic device operator 220 and perform an action specified by the control input to carry out the task. In some embodiments, robotic device 210 and robotic device operator 220 may be located at different locations and may communicate with one another via network 240 associated with system 200 (or via any other communication channel or channels in other implementations). In this case, robotic device operator 220 may control robotic device 210 remotely.

Camera 212 may be a video capturing device associated with robotic device 210 and configured to capture a video stream of the operating environment in which robotic device 210 operates. In some embodiments, camera 212 may be integrated in robotic device 210, Alternatively, camera 212 may be an external device coupled to robotic device 210 and/or positioned relative to robotic device 210 to capture the operating environment of robotic device 210. In some embodiments, robotic device 210 may obtain captured frames in the video stream of the operating environment of robotic device 210 from camera 212 and transmit the captured frames to other components (e.g., robotic device operator 220, MEC device 230, etc.) of system 200. Additionally or alternatively, camera 212 may transmit the captured frames in the video stream of the operating environment of robotic device 210 to the other components of system 200, with or without providing the captured frames to robotic device 210.

Robotic device operator 220 may be a computing device configured to control and/or manage operations of robotic device 210. In some embodiments, robotic device operator 220 may generate a control input for robotic device 210 based on a context in the operating environment of robotic device 210 at a particular time and transmit the control input to robotic device 210. Additionally or alternatively, robotic device operator 220 may present the context in the operating environment of robotic device 210 at the particular time to a user, receive a control input that the user provides based on the context, and transmit the control input to robotic device 210 to control robotic device 210. Accordingly, the control input provided to control robotic device 210 may be based on the context in the operating environment of robotic device 210 at the particular time and may specify a corresponding action for robotic device 210 to perform in response to the context.

In some embodiments, robotic device 210 and robotic device operator 220 may be located at different locations and may communicate with one another via a communication channel between robotic device 210 and robotic device operator 220, such as via a communication channel over a network. The communication channel between robotic device 210 and robotic device operator 220 may also be referred to herein as the communication channel. In some embodiments, data transmitted via the communication channel may be subjected to a latency such as a communication latency of the communication channel. The communication latency may include a network latency for transmitting the data over the network via the communication channel and/or other types of latency that may be introduced as the data travels through the communication channel.

In some embodiments, the communication channel may include only robotic device 210 and robotic device operator 220. Accordingly, the communication channel may include a direct connection between robotic device 210 and robotic device operator 220, and thus data may be transmitted between robotic device 210 and robotic device operator 220 via the direct connection without passing through other network devices. In this case, the communication latency of the communication channel may include a first latency for transmitting data from robotic device 210 to robotic device operator 220 via the direct connection and/or a second latency for transmitting data from robotic device operator 220 to robotic device 210 via the direct connection. The first latency for transmitting data from robotic device 210 to robotic device operator 220 may have a same value or a different value as compared to the second latency for transmitting data from robotic device operator 220 to robotic device 210. In some embodiments, any of the communication latency of the communication channel, the first latency for transmitting data from robotic device 210 to robotic device operator 220, and/or the second latency for transmitting data from robotic device operator 220 to robotic device 210 may be monitored (e.g., by latency management system 100).

In some embodiments, in addition to robotic device 210 and robotic device operator 220, the communication channel may further include one or more network devices (e.g., base stations, cell aggregation sites, etc.) located on a network path between robotic device 210 and robotic device operator 220. As data travels between robotic device 210 and robotic device operator 220, the data may pass through the one or more network devices. Thus, the one or more network devices may be considered network devices associated with the communication channel and may be referred to as participating nodes of the communication channel. In some embodiments, the network devices associated with the communication channel may also be computing devices that have computation capabilities.

In some embodiments, data transmitted from robotic device 210 to robotic device operator 220 may sequentially pass through one or more network devices such as one or more first participating nodes of the communication channel to arrive at robotic device operator 220. Accordingly, when data is transmitted from robotic device 210 to robotic device operator 220 via the communication channel, the data may travel through a plurality of first connections in which each first connection may be between two consecutive nodes in a first sequence of nodes that includes robotic device 210, the one or more first participating nodes, and robotic device operator 220. Thus, the communication channel may include the first connections formed by the first sequence of nodes, and therefore a first latency for transmitting data from robotic device 210 to robotic device operator 220 may equal a total communication latency on the plurality of first connections.

Similarly, data transmitted from robotic device operator 220 to robotic device 210 may sequentially pass through one or more second participating nodes of the communication channel to arrive at robotic device 210. The second participating nodes may or may not be the same as the first participating nodes. Accordingly, when data is transmitted from robotic device operator 220 to robotic device 210 via the communication channel, the data may travel through a plurality of second connections in which each second connection may be between two consecutive nodes in a second sequence of nodes that includes robotic device operator 220, the one or more second participating nodes, and robotic device 210. Thus, the communication channel may include the second connections formed by the second sequence of nodes, and therefore a second latency for transmitting data from robotic device operator 220 to robotic device 210 may equal a total communication latency on the plurality of second connections.

In this case, the communication latency of the communication channel may include the first latency for transmitting data from robotic device 210 to robotic device operator 220 and/or the second latency for transmitting data from robotic device operator 220 to robotic device 210 described above. The first latency for transmitting data from robotic device 210 to robotic device operator 220 may have a same value or a different value as compared to the second latency for transmitting data from robotic device operator 220 to robotic device 210. In some embodiments, any of the communication latency of the communication channel, the first latency for transmitting data from robotic device 210 to robotic device operator 220, and the second latency for transmitting data from robotic device operator 220 to robotic device 210 may be monitored (e.g., by latency management system 100). In addition, the communication latency on one or more first connections of the communication channel and the communication latency on one or more second connections of the communication channel may also be monitored.

MEC device 230 may be a computing device including a processor, a memory, and network communication capabilities (e.g., a communication unit). In some embodiments, MEC device 230 may be implemented by one or more network devices associated with the communication channel. For example, MEC device 230 may be implemented by one or more first participating nodes of the communication channel through which data is transmitted from robotic device 210 to robotic device operator 220 described above. In some embodiments, the network devices that implement MEC device 230 may be geographically located proximate to robotic device 210 and/or robotic device operator 220. For example, each network device implementing MEC device 230 may have a shorter geographical distance to robotic device 210 and/or robotic device operator 220 as compared to a cloud computing device located in a remote data center. Accordingly, the network device implementing MEC device 230 may be considered located at the edge of the network and may be referred to as a network edge device.

In some embodiments, one or more network devices through which data is transmitted from robotic device 210 to robotic device operator 220 may implement MEC device 230 in the form of a hardware server or a virtual server. As an example, MEC device 230 may be a hardware server deployed on a base station, a cell aggregation site, and/or other network devices associated with the communication channel that participate in data transmission from robotic device 210 to robotic device operator 220. As another example, MEC device 230 may be a virtual server residing on one or more base stations, cell aggregation sites, and/or other network devices associated with the communication channel that participate in data transmission from robotic device 210 to robotic device operator 220. In this case, these network devices may contribute various resources (e.g., computing resources, storage resources, etc.) to establish MEC device 230.

In some embodiments, latency management system 100 may be deployed with one or more components of system 200. For example, latency management system 100 may be implemented at robotic device 210, robotic device operator 220, a computing device (e.g., MEC device 230) through which data is transmitted from robotic device 210 to robotic device operator 220, and/or any combination thereof. In some embodiments, robotic device 210, robotic device operator 220, and/or MEC device 230 may collaborate with one another to perform one or more operations of latency management system 100 described herein.

Figure 3:
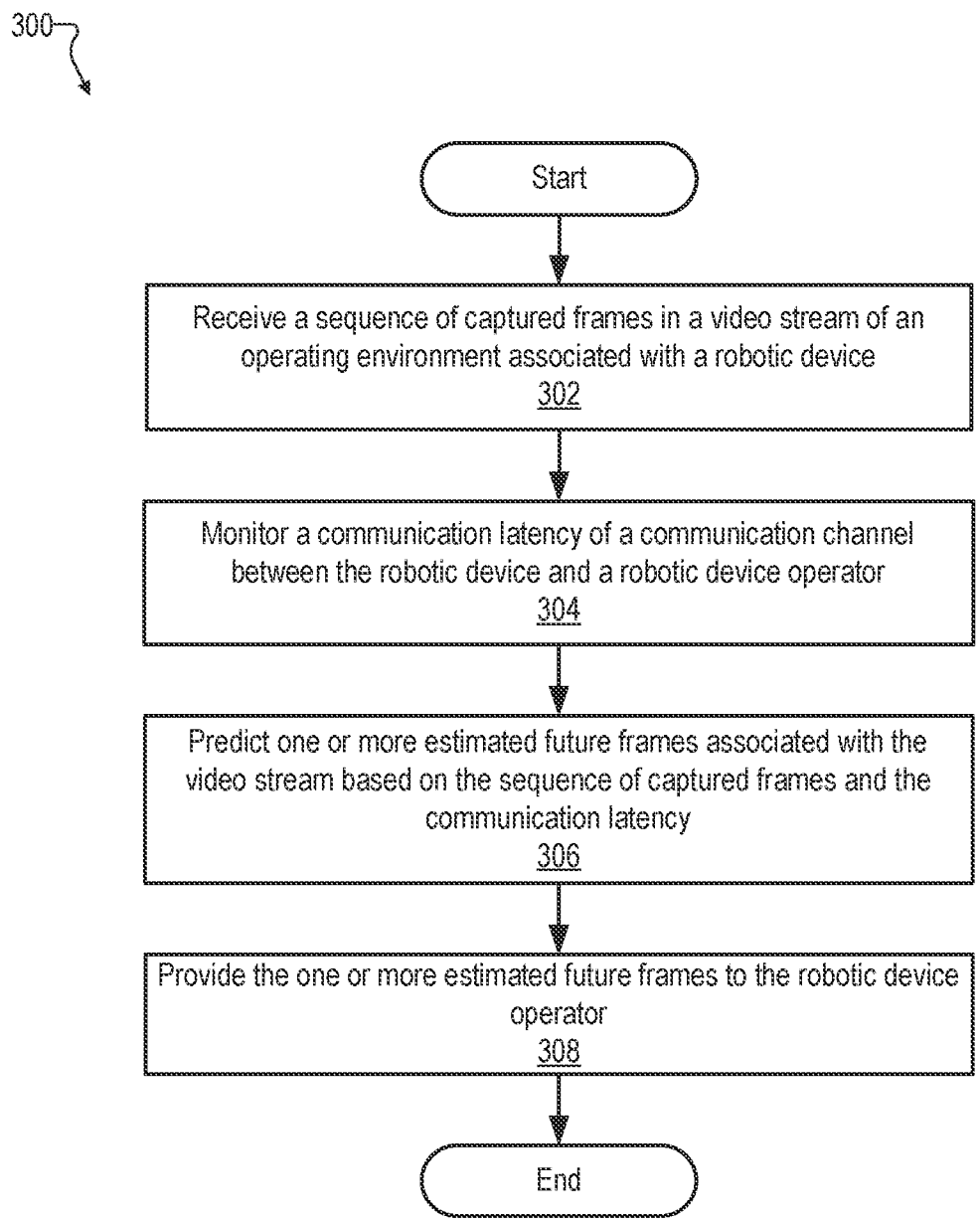
FIG. 3 shows an illustrative latency management method for controlling a robotic device remotely according to embodiments described herein.

FIG. 3 shows an illustrative method 300, which may be performed by latency management system 100 and/or by any implementation thereof for managing latency such as communication latency to remotely control a robotic device such as robotic device 210. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described.

At operation 302, latency management system 100 may receive one or more images (e.g., one or more captured frames) in a stream (e.g., a video stream) of an operating environment associated with robotic device 210. Each captured frame in the video stream may be an image captured by camera 212 at a frame timestamp and may depict a context in the operating environment of robotic device 210 at the frame timestamp. In some embodiments, the latency management system 100 may receive the sequence of captured frames in the video stream from robotic device 210 and/or from camera 212 associated with robotic device 210. For example, when a captured frame is captured by camera 212, robotic device 210 and/or camera 212 may transmit the captured frame to latency management system 100 individually. Additionally or alternatively, robotic device 210 and/or camera 212 may periodically transmit multiple sequential captured frames together as a group to latency management system 100.

At operation 304, latency management system 100 may monitor a communication latency of the communication channel between robotic device 210 and robotic device operator 220. In some embodiments, the communication latency of the communication channel may be a two-way communication latency that includes a first latency for transmitting data from robotic device 210 to robotic device operator 220 and a second latency for transmitting data from robotic device operator 220 to robotic device 210 via the communication channel. In some embodiments, latency management system 100 may monitor the communication latency of the communication channel in one or more latency monitoring windows. During each latency monitoring window, latency management system 100 may perform multiple latency measurements to measure the value of the communication latency of the communication channel multiple times. For example, latency management system 100 may periodically measure the value of the communication latency of the communication channel at a predefined interval (e.g., every 2s) during the latency monitoring window. In some embodiments, latency management system 100 may select a highest communication latency of the communication channel in the latency monitoring window or an average communication latency of the communication channel in the latency monitoring window to be the communication latency of the communication channel being used in a future frame prediction.

In some embodiments, to measure the communication latency of the communication channel in a latency measurement, robotic device 210 may initiate a latency measurement request such as a ping request. The ping request may be transmitted from robotic device 210 to robotic device operator 220 and then be transmitted from robotic device operator 220 back to robotic device 210 via the communication channel. In some embodiments, an amount of time between a timestamp at which the ping request is transmitted from robotic device 210 and a timestamp at which the ping request is received back at robotic device 210 may be considered the communication latency of the communication channel in the latency measurement.

In some embodiments, in addition to the communication latency of the communication channel, latency management system 100 may monitor the first latency for transmitting data from robotic device 210 to robotic device operator 220 and the second latency for transmitting data from robotic device operator 220 to robotic device 210. In some embodiments, latency management system 100 or a component of latency management system 100 such as a machine learning model may reside on MEC device 230. As described herein, MEC device 230 may be implemented by one or more first participating nodes of the communication channel that participate in data transmission from robotic device 210 to robotic device operator 220. In this case, latency management system 100 may additionally monitor a communication latency for transmitting data from robotic device 210 to MEC device 230 and a communication latency for transmitting data from MEC device 230 to robotic device operator 220.

At operation 306, latency management system 100 may predict one or more estimated future frames associated with the video stream of the operating environment of robotic device 210 based on the sequence of captured frames in the video stream and the communication latency of the communication channel. Each estimated future frame associated with the video stream may be a predicted image corresponding to a frame timestamp in the future and may depict a predicted future context in the operating environment of robotic device 210 at that future frame timestamp.

In some embodiments, to predict the one or more estimated future frame, latency management system 100 may identify one or more captured frames in the sequence that are captured the most recently, and use the one or more captured frames as input frames to predict one or more estimated future frames. In some embodiments, latency management system 100 may also determine a target future timestamp based on the communication latency of the communication channel and an estimated processing time for predicting one or more estimated future frames in the video stream. Latency management system 100 may then identify the one or more estimated future frames to be predicted based on the target future timestamp. For example, latency management system 100 may identify one or more estimated future frames associated with the video stream that precede the target future timestamp and have shortest time distances between their future frame timestamp and the target future timestamp, and specify these estimated future frames to be the one or more estimated future frames being predicted. Accordingly, latency management system 100 may predict the estimated future frames that depict the future contexts in the operating environment of robotic device 210 as far into the future as the target future timestamp. In some embodiments, latency management system 100 may predict the one or more estimated future frames based on the input frames using a machine learning model.

In some embodiments, the machine learning model may be implemented using one or more supervised and/or unsupervised learning algorithms. For example, the machine learning model may be implemented in the form of a linear regression model, a logistic regression model, a Support Vector Machine (SVM) model, and/or other learning models. Additionally or alternatively, the machine learning model may be implemented in the form of a neural network including an input layer, one or more hidden layers, and an output layer. Non-limiting examples of the neural network include, but are not limited to, Convolutional Neural Network (CNN), Recurrent Neural Network (RNN), Long Short-Term Memory (LSTM) neural network, etc. Other system architectures for implementing the machine learning model are also possible and contemplated. In some embodiments, the machine learning model may be implemented on or by a physical computing device such as a computing device 700 depicted in Fla 7.

At operation 308, latency management system 100 may provide the one or more estimated future frames to robotic device operator 220. In some embodiments, robotic device operator 220 may use at least one estimated future frame among the one or more estimated future frames to determine a control input for robotic device 210. To determine the control input for robotic device 210 at a given time such as a current time, robotic device operator 220 may identify, from the one or more estimated future frames provided to robotic device operator 220, an estimated future frame that has a frame timestamp subsequent to the current time by a time amount equal to the second latency for transmitting data from robotic device operator 220 to robotic device 210. Robotic device operator 220 may then determine the control input for robotic device 210 based on the estimated future frame. For example, robotic device operator 220 may generate the control input based on the predicted future context in the operating environment of robotic device 210 depicted in the estimated future frame. Additionally or alternatively, robotic device operator 220 may present the estimated future frame to a user, and receive the control input that the user provides based on the predicted future context in the operating environment of robotic device 210 depicted in the estimated future frame. In some embodiments, the control input may specify an action for robotic device 210 to perform in response to that predicted future context.

In some embodiments, robotic device operator 220 may transmit the control input to robotic device 210 via the communication channel. As described above, the control input may be determined at a given time such as a current time and may be based on the estimated future frame that has the frame timestamp subsequent to the current time by the amount of time needed to transmit data (e.g., the control input) from robotic device operator 220 to robotic device 210. Accordingly, the estimated future frame being used to determine the control input may have its frame timestamp equal to an approximate time at which the control input would arrive at robotic device 210 and may depict the predicted future context in the operating environment of robotic device 210 at the approximate time. As a result, the control input determined based on the estimated future frame may be suitable for the predicted future context in the operating environment of robotic device 210 at the approximate time when the control input may arrive at robotic device 210 and robotic device 210 may perform the action specified in the control input. As a result, the accuracy in controlling robotic device 210 with the control input may increase.

Figure 4:
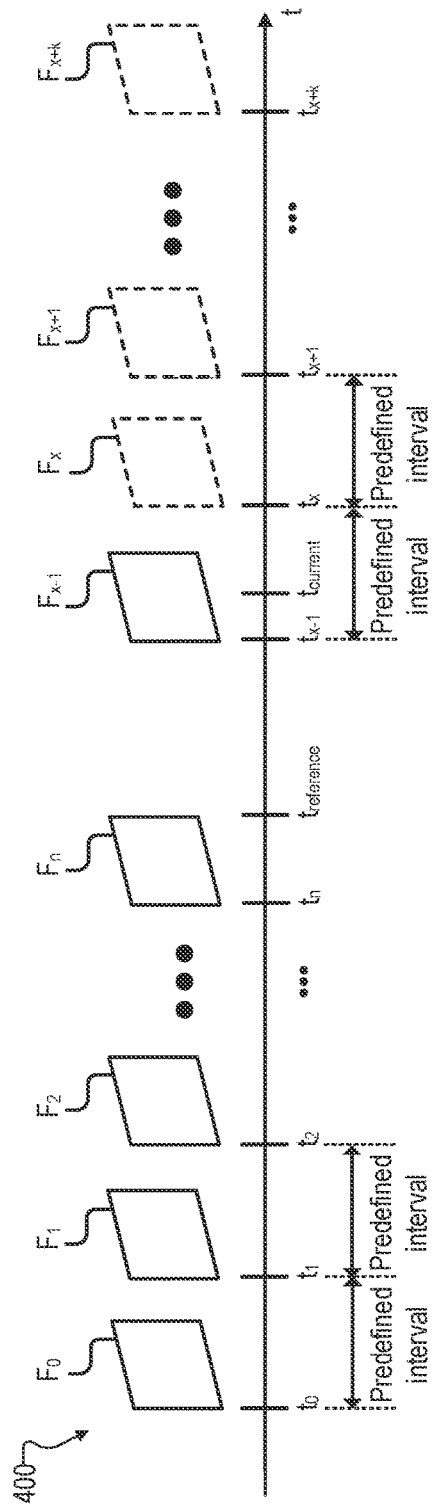
FIG. 4 shows an illustrative video stream according to embodiments described herein.

Accordingly, robotic device operator 220 may control robotic device 210 with control inputs that are determined based on estimated future frames associated with the video stream of the operating environment of robotic device 210. As described above, the estimated future frames may be predicted based on the captured frames in the video stream of the operating environment of robotic device 210. An illustrative video stream 400 of the operating environment of robotic device 210 is depicted in FIG. 4. In some embodiments, video stream 400 may include a plurality of video frames captured by camera 212 at a predefined interval. For example, camera 212 may capture video stream 400 at a frame rate of 100 fps and thus an additional video frame may be captured for video stream 400 every 10 ms.

As depicted in FIG. 4, video stream 400 may include a sequence of captured frames $F_0$-$F_n$. In some embodiments, each captured frame in video stream 400 may be an image captured by camera 212 at a frame timestamp and may depict a context in the operating environment of robotic device 210 at the frame timestamp. In some embodiments, the captured frames in video stream 400 may be organized in a chronological order of their frame timestamp. Accordingly, the sequence of captured frames in video stream 400 may be respectively captured at a sequence of frame timestamps in which two consecutive frame timestamps may have a time distance therebetween equal to the predefined interval (e.g., 10 ms) at which the video frames of video stream 400 are captured as depicted in FIG. 4.

In some embodiments, a frame timestamp of a captured frame in video stream 400 may indicate an age or a recency of the captured frame relative to other captured frames in video stream 400. For example, as depicted in FIG. 4, a captured frame $F_0$ in video stream 400 may have a frame timestamp $t_0$ prior to a frame timestamp $t_n$ of a captured frame $F_n$ in video stream 400. Accordingly, the captured frame $F_0$ may be considered older or less recent than the captured frame $F_n$, and the captured frame $F_n$ may be considered newer or more recent than the captured frame $F_0$. In this case, the captured frame $F_0$ may be considered preceding or prior to the captured frame $F_n$, and the captured frame $F_n$ may be considered succeeding or subsequent to the captured frame $F_0$.

In some embodiments, the frame timestamp of the captured frame in video stream 400 may also be used to evaluate the recency of the captured frame relative to a reference time. For example, as depicted in FIG. 4, the captured frame $F_0$ may have a first time distance between its frame timestamp $t_0$ and a reference time $t_{reference}$, and the captured frame $F_n$ may have a second time distance between its frame timestamp $t_n$ and the reference time $t_{reference}$. As depicted in FIG. 4, the reference time $t_{reference}$ may be subsequent to both the frame timestamp $t_0$ of the captured frame $F_0$ and the frame timestamp $t_n$ of the captured frame $F_n$. Because the frame timestamp $t_0$ of the captured frame $F_0$ is prior to the frame timestamp $t_0$ of the captured frame $F_n$, the first time distance between the frame timestamp $t_0$ of the captured frame $F_0$ and the reference time $t_{reference}$ may be longer than the second time distance between the frame timestamp $t_n$ of the captured frame $F_n$ and the reference time $t_{reference}$. Accordingly, the captured frame $F_0$ may be considered less recent to the reference time $t_{reference}$ than the captured frame $F_n$, and the captured frame $F_n$ may be considered more recent to the reference time $t_{reference}$ than the captured frame $F_0$.

In some embodiments, one or more captured frames may have their frame timestamps preceding the reference time $t_{reference}$ and also have shortest time distances between their frame timestamps and the reference time $t_{reference}$ as compared to other captured frames in video stream 400. In this case, the captured frames may be considered the captured frames in video stream 400 that are most recent to the reference time $t_{reference}$. Similarly, one or more captured frames may have shortest time distances between their frame timestamps and a current time as compared to other captured frames in video stream 400. In this case, these captured frames may be considered the captured frames in video stream 400 that are most recent to the current time and therefore may be captured most recently by camera 212 as compared to other captured frames in video stream 400.

In some embodiments, in addition to the sequence of captured frames, video stream 400 may also include a sequence of future frames. At a given time such as a current time $t_{current}$, the sequence of future frames may include one or more future frames $F_x$-$F_{x+k}$ that will be captured for video stream 400 after the given time as depicted in FIG. 4. In some embodiments, each future frame may correspond to a frame timestamp at which the future frame will be captured by camera 212. When camera 212 captures the future frame at the frame timestamp in the future, the future frame may depict a context in the operating environment of robotic device 210 at that frame timestamp. In some embodiments, similar to a frame timestamp of a captured frame, the frame timestamp of the future frame may indicate an age or a recency of the future frame relative to the captured frames and/or to other future frames of video stream 400. The frame timestamp of the future frame may also be used to evaluate the recency of the future frame relative to a reference time in a similar manner.

In some embodiments, the frame timestamps of the future frames in video stream 400 at a given time may be determined based on a frame timestamp of a captured frame in video stream 400 that is most recent to the given time and the predefined interval (e.g., 10 ms) at which the video frames of video stream 400 are captured. For example, as depicted in FIG. 4, the captured frame that is most recent to the given time $t_{current}$ may be a captured frame $F_{x-1}$ corresponding to frame timestamp $t_{x-1}$. The captured frame $F_{x-1}$ may have a shortest time distance between its frame timestamp $t_{x-1}$ and the given time $t_{current}$ as compared to other captured frames in video stream 400. In this case, a frame timestamp of a future frame in the sequence of future frames $F_x$-$F_{x+k}$ may be subsequent to the frame timestamp $t_{x-1}$ of the captured frame $F_{x-1}$ by a time amount equal to one or more times the value of the predefined interval (e.g., 10 ms) at which the video frames of video stream 400 are captured as depicted in FIG. 4.

In some embodiments, latency management system 100 may predict one or more estimated future frames associated with video stream 400 and use the estimated future frames to determine control inputs for robotic device 210 as described herein. In some embodiments, an estimated future frame associated with video stream 400 may correspond to a future frame of video stream 400 that will be captured by camera 212 in the future. The estimated future frame may have the same frame timestamp as the future frame and may depict a predicted future context in the operating environment of robotic device 210 at the frame timestamp of the future frame. Thus, the estimated future frame may provide a prediction of a future context that will be depicted in the future frame when the future frame is captured by camera 212.

In some embodiments, latency management system 100 may perform one or more future frame predictions in one or more prediction cycles to predict estimated future frames associated with video stream 400. Each prediction cycle may extend from a prediction start time to a prediction end time during which latency management system 100 may perform a future frame prediction to generate one or more estimated future frames from a set of input frames.

In some embodiments, latency management system 100 may perform a first prediction cycle at a first prediction start time, and then perform a second prediction cycle at a second prediction start time subsequent to the first prediction start time. In this case, the first prediction cycle may be considered a previous prediction cycle of the second prediction cycle, and the second prediction cycle may be considered a subsequent prediction cycle of the first prediction cycle. In some embodiments, latency management system 100 may perform the first prediction cycle, and then perform the second prediction cycle with no other prediction cycle in between. In this case, the first prediction cycle may be consecutively prior to the second prediction cycle and may be referred to as a preceding prediction cycle of the second prediction cycle. The second prediction cycle may be consecutively subsequent to the first prediction cycle and may be referred to as a following prediction cycle or a next prediction cycle of the first prediction cycle.

In some embodiments, to predict one or more estimated future frames in a prediction cycle, latency management system 100 may identify a set of input frames from the sequence of captured frames of video stream 400 that are received at latency management system 100. The set of input frames may include a single capture frame or multiple capture frames in video stream 400 that may be used to predict the one or more estimated future frames associated with video stream 400 in the prediction cycle. Thus, the one or more estimated future frames may be predicted based on a single captured frame or multiple capture frames of video stream 400. In some embodiments, the set of input frames may include a predefined number of sequential captured frames in video stream 400 that are most recent to a current time. As described herein, the captured frames in video stream 400 that are most recent to the current time may be captured by camera 212 most recently and may have shortest time distances between their frame timestamp and the current time as compared to other captured frames in video stream 400. In some embodiments, the number of captured frames included in the set of input frames may equal a number of video frames needed or used as input data for a prediction component (e.g., a machine learning model) of latency management system 100 to predict a predefined number (e.g., 15) of estimated future frames. For example, the machine learning model may use 20 video frames as input data to predict 15 estimated future frames. In this case, the set of input frames may include 20 captured frames of video stream 400 and the machine learning model may use the set of input frames including 20 captured frames of video stream 400 to predict 15 estimated future frames associated with video stream 400.

In some embodiments, to identify the set of input frames for a future frame prediction performed in a prediction cycle, latency management system 100 may implement a frame buffer that has a buffer size equal to the number (e.g., 20) of captured frames in the set of input frames. In some embodiments, the frame buffer may be configured to store one or more captured frames of video stream 400 that are captured most recently among the captured frames of video stream 400 that arrive at latency management system 100. Thus, at a given time such as a current time, the captured frames in the frame buffer may be the captured frames that are most recent to the current time and may have shortest time distances between their frame timestamp and the current time as compared to other captured frames of video stream 400 that arrive at latency management system 100. In some embodiments, the captured frames of video stream 400 in the frame buffer may be organized in a chronological order of their frame timestamp.

In some embodiments, the frame buffer may be updated each time latency management system 100 receives one or more additional captured frames of video stream 400 from camera 212 and/or robotic device 210. For example, the frame buffer may store one or more first captured frames of video stream 400 when latency management system 100 receives one or more second captured frames of video stream 400. The second captured frames that are newly received may be captured subsequent to the first captured frames currently stored in the frame buffer, and therefore the second captured frames may have the frame timestamps subsequent to the frame timestamps of the first captured frames in the frame buffer.

In some embodiments, latency management system 100 may update the frame buffer to add the second captured frames to the frame buffer and remove one or more first captured frames from the frame buffer such that the total number of captured frames in the frame buffer does not exceed its buffer size. In some embodiments, each first captured frame being removed from the frame buffer may have a frame timestamp prior to the frame timestamps of the first captured frames being retained in the frame buffer and prior to the frame timestamps of the second captured frames. Accordingly, latency management system 100 may remove from the frame buffer the first captured frames that are captured least recently among the first captured frames currently in the frame buffer, and add to the frame buffer the second captured frames that are captured more recently than the first captured frames currently in the frame buffer. As a result, the frame buffer may store the captured frames of video stream 400 that are captured most recently among the captured frames of video stream 400 that arrive at latency management system 100 as described above.

In some embodiments, latency management system 100 may also monitor a number of captured frames in the frame buffer that have not been used to perform a future frame prediction in a prediction cycle. In some embodiments, latency management system 100 may determine whether the number of these captured frames satisfies a threshold number (e.g., 1 frame, 5 frames, the buffer size of the frame buffer (e.g., 20 frames), etc.). In some embodiments, if the number of these captured frames satisfies the threshold number, latency management system 100 may determine that the frame buffer includes a sufficient number of captured frames that are captured recently but have not been used in any future frame prediction.

In response to such determination, latency management system 100 may initiate a prediction cycle to perform a future frame prediction with all the captured frames in the frame buffer being included in the set of input frames. Thus, the set of input frames may include the captured frames that are captured most recently among the captured frames provided to latency management system 100. In some embodiments, the set of input frames being used in the prediction cycle may include one or more captured frames that are captured more recently than the captured frames in a set of input frames being used in a preceding prediction cycle consecutively prior to the prediction cycle. Accordingly, the prediction cycle may be performed with at least one captured frame that is captured subsequent to the captured frames being used in the preceding prediction cycle. In some embodiments, the set of input frames being used in the prediction cycle and the set of input frames being used in the preceding prediction cycle may or may not overlap.

In some embodiments, in addition to the set of input frames, latency management system 100 may also identify one or more estimated future frames to be predicted in the prediction cycle. During the prediction cycle, latency management system 100 may predict a predefined number (e.g., 15) of estimated future frames based on the set of input frames. In some embodiments, to identify the estimated future frames being predicted, latency management system 100 may determine a target future timestamp based on the communication latency of the communication channel between robotic device 210 and robotic device operator 220 and an estimated processing time for predicting the predefined number of estimated future frames.

As described herein, the communication latency of the communication channel may be a two-way communication latency that includes a first latency for transmitting data from robotic device 210 to robotic device operator 220 and a second latency for transmitting data from robotic device operator 220 to robotic device 210 via the communication channel. Accordingly, the communication latency of the communication channel may account for a total time amount including a first time amount for providing the captured frames of video stream 400 to a computing device on which latency management system 100 (or a prediction component of latency management system 100 such as a machine learning model) is implemented to generate the estimated future frames at the computing device, a second time amount for providing the estimated future frames generated at the computing device from the computing device to robotic device operator 220, and a third time amount for providing a control input determined based on an estimated future frame among the estimated future frames from robotic device operator 220 to robotic device 210.

As an example, latency management system 100 or the prediction component of latency management system 100 may be implemented on robotic device 210 and the estimated future frames may be predicted by latency management system 100 at robotic device 210. In this case, the communication latency of the communication channel may account for a total time amount including a first time amount for transmitting the estimated future frames generated at robotic device 210 from robotic device 210 to robotic device operator 220, and a second time amount for transmitting a control input determined based on an estimated future frame among the estimated future frames from robotic device operator 220 to robotic device 210.

As another example, latency management system 100 or the prediction component of latency management system 100 may be implemented on MEC device 230 and the estimated future frames may be predicted by latency management system 100 at MEC device 230. As described herein, MEC device 230 may be implemented by one or more first participating nodes of the communication channel through which data travels from robotic device 210 to robotic device operator 220. In this case, the communication latency of the communication channel may account for a total time amount including a first time amount for transmitting the captured frames from robotic device 210 to MEC device 230 to predict the estimated future frames at MEC device 230, a second time amount for transmitting the estimated future frames generated at MEC device 230 from MEC device 230 to robotic device operator 220, and a third time amount for transmitting a control input determined based on an estimated future frame among the estimated future frames from robotic device operator 220 to robotic device 210.

As another example, latency management system 100 or the prediction component of latency management system 100 may be implemented on robotic device operator 220 and the estimated future frames may be predicted by latency management system 100 at robotic device operator 220. In this case, the communication latency of the communication channel may account for a total time amount including a first time amount for transmitting the captured frames from robotic device 210 to robotic device operator 220 to predict the estimated future frames at robotic device operator 220, and a second time amount for transmitting a control input determined based on an estimated future frame among the estimated future frames generated at robotic device operator 220 from robotic device operator 220 to robotic device 210.

In some embodiments, the estimated processing time may be an amount of time during which the estimated future frames are generated based on the set of input frames in the prediction cycle. In some embodiments, latency management system 100 may implement the prediction component such as a machine learning model and the machine learning model may be used to predict the estimated future frames from the set of input frames. As described herein, latency management system 100 may predict the predefined number (e.g., 15) of estimated future frames based on the set of input frames in the prediction cycle. Accordingly, the estimated processing time may be an amount of time for the machine learning model to predict the predefined number (e.g., 15) of estimated future frames. In some embodiments, such an amount of time may depend on a complexity level of a machine learning algorithm implemented by the machine learning model and/or a complexity level of a hardware structure on which the machine learning model resides.

In some embodiments, for a prediction cycle that has no other prediction cycle being performed previously, latency management system 100 may determine the estimated processing time to be an average amount of time for the machine learning model to predict the predefined number (e.g., 15) of video frames in general. For other prediction cycles, latency management system 100 may determine the estimated processing time to be an average amount of time for the machine learning model to predict the predefined number (e.g., 15) of estimated future frames associated with video stream 400 in one or more previous prediction cycles. Additionally or alternatively, latency management system 100 may determine the estimated processing time to be an amount of time for the machine learning model to predict the predefined number (e.g., 15) of estimated future frames associated with video stream 400 in a preceding prediction cycle. Other implementations for determining the estimated processing time are also possible and contemplated.

In some embodiments, latency management system 100 may determine the target future timestamp based on the communication latency of the communication channel between robotic device 210 and robotic device operator 220 and the estimated processing time for predicting the predefined number of estimated future frames described above.

For example, latency management system 100 may select a base timestamp associated with the set of input frames being used in the prediction cycle. The base timestamp may be a frame timestamp of an input frame that is captured least recently in the set of input frames and therefore has a frame timestamp prior to frame timestamps of other input frames in the set of input frames. Additionally or alternatively, the base timestamp may be a frame timestamp of an input frame that is captured most recently in the set of input frames and therefore has a frame timestamp subsequent to frame timestamps of other input frames in the set of input frames. Additionally or alternatively, the base timestamp may be a frame timestamp of any input frame in the set of input frames, such as an input frame randomly selected from the set of input frames. Other implementations for determining the base timestamp are also possible and contemplated.

In some embodiments, latency management system 100 may compute the target future timestamp based on the base timestamp, the communication latency of the communication channel between robotic device 210 and robotic device operator 220, and the estimated processing time for predicting the predefined number of estimated future frames. For example, the target future timestamp may be a future timestamp that is subsequent to the base timestamp by a time amount equal to a sum of the communication latency of the communication channel and the estimated processing time. Other implementations for determining the target future timestamp are also possible and contemplated.

In some embodiments, latency management system 100 may identify one or more estimated future frames to be predicted in the prediction cycle based on the target future timestamp. For example, latency management system 100 may identify the predefined number (e.g., 15) of future frames in video stream 400 that are most recent to the target future timestamp and have frame timestamps that precede the target future timestamp. Accordingly, these future frames may have frame timestamps prior to the target future timestamp and also have shortest time distances between their frame timestamps and the target future timestamp as compared to other future frames preceding the target future timestamp in video stream 400. In some embodiments, the target future timestamp may match a frame timestamp of a future frame in video stream 400. In this case, latency management system 100 may also include that future frame in the predefined number (e.g., 15) of future frames being identified.

In some embodiments, latency management system 100 may determine the predefined number (e.g., 15) of estimated future frames corresponding to the predefined number (e.g., 15) of identified future frames to be the estimated future frames being predicted in the prediction cycle. The estimated future frames may have the same frame timestamps as the identified future frames and may depict predicted future contexts in the operating environment of robotic device 210 at the frame timestamps of the identified future frames. As the identified future frames are most recent to the target future timestamp and have their frame timestamps preceding or matching the target future timestamp, the estimated future frames may provide prediction of the future contexts in the operating environment of robotic device 210 as far into the future as the target future timestamp.

Figure 5:
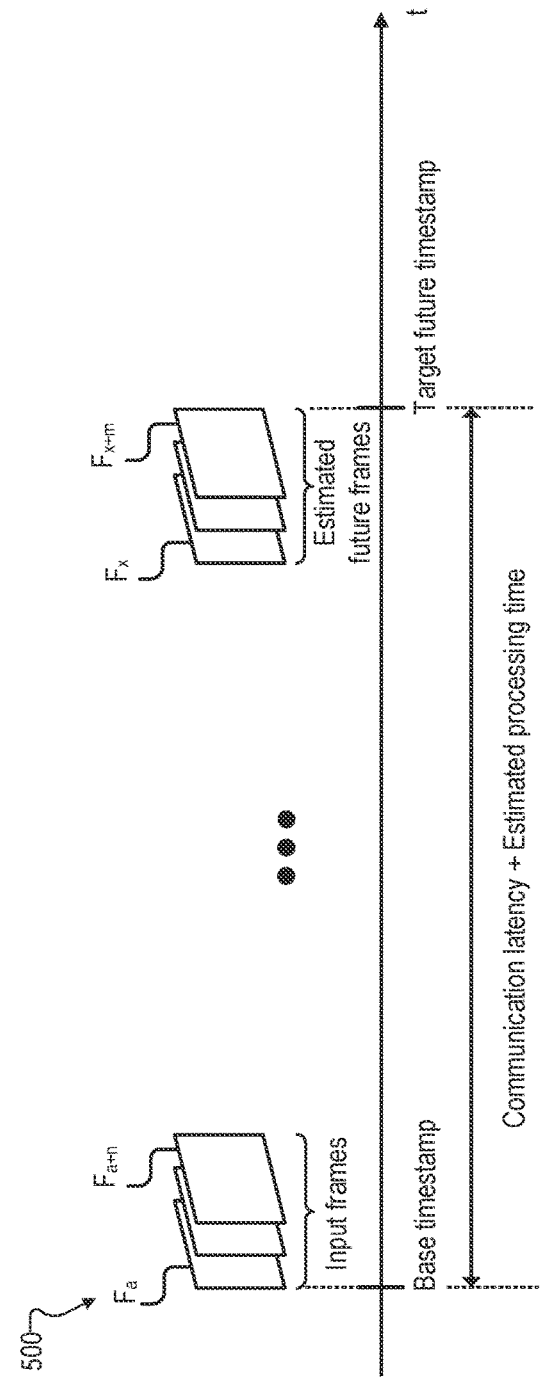
FIG. 5 shows an illustrative diagram depicting a temporal relationship between input frames, estimated future frames, and a target future timestamp according to embodiments described herein.

FIG. 5 shows a diagram 500 illustrating a temporal relationship between a set of input frames, a predefined number (e.g., 15) of estimated future frames predicted based on the set of input frames, and a target future timestamp associated with a prediction cycle. As depicted in FIG. 5, the target future timestamp may be subsequent to a base timestamp by a time amount equal to a sum of the communication latency of the communication channel and the estimated processing time. As described herein, the base timestamp may be a frame timestamp of an input frame in the set of input frames and may indicate the time at which the input frame is captured. As described herein, the communication latency of the communication channel may be the two-way communication latency of the communication channel that approximately accounts for a total amount of time to communicate data related to the future frame prediction (such as the captured frames, the estimated future frames) and data related to robotic control (such as the estimated future frames, the control input) between the computing devices (e.g., robotic device 210, robotic device operator 220, and/or MEC device 230) of system 200. As described herein, the estimated processing time may be the amount of time for latency management system 100 to predict the predefined number of estimated future frames based on the set of input frames at one or more computing devices of system 200 on which latency management system 100 or the prediction component (e.g., the machine learning model) of latency management system 100 is implemented.

Thus, with the target future timestamp being computed based on the factors described above, by predicting the estimated future frames that depict the future contexts in the operating environment of robotic device 210 as far into the future as the target future timestamp, latency management system 100 may advance video stream 400 far enough into the future to compensate for both the time amount to perform the future frame prediction and the time amount to communicate relevant data (e.g., the captured frames, the estimated future frames, the control input) between the computing devices of system 200. As a result, when determining a control input for robotic device 210, latency management system 100 may identify, from the estimated future frames being predicted, an estimated future frame that depicts the predicted future context in the operating environment of robotic device 210 at the time robotic device 210 would receive the control input in the future. Latency management system 100 may then use the estimated future frame to determine the control input. Thus, the control input may be suitable for the future context in the operating environment of robotic device 210 at the time robotic device 210 would receive the control input and perform the action specified by the control input, and therefore the accuracy in controlling robotic device 210 with the control input may increase.

As described above, the estimated future frames to be predicted in the prediction cycle may be identified based on the target future timestamp. For example, the estimated future frames being predicted may correspond to the future frames in video stream 400 that are most recent to the target future timestamp and have their frame timestamps preceding or matching the target future timestamp as described above. In some embodiments, instead of or in addition to identifying the future frames in video stream 400 that are most recent to the target future timestamp and have their frame timestamps preceding or matching the target future timestamp, latency management system 100 may identify the future frames in video stream 400 that are most recent to the target future timestamp and succeeding the target future timestamp. These future frames may have their frame timestamps subsequent to the target future timestamp and may have shortest time distances between their frame timestamps and the target future timestamp as compared to other future frames succeeding the target future timestamp in video stream 400. In some embodiments, latency management system 100 may identify the estimated future frames corresponding to these future frames to be the estimated future frames being predicted in the prediction cycle. Other implementations for identifying the corresponding future frames in video stream 400 and/or identifying the estimated future frames to be predicted in the prediction cycle are also possible and contemplated.

In some embodiments, after the estimated future frames to be predicted in the prediction cycle are identified based on the target future timestamp as described above, latency management system 100 may identify, from the estimated future frames to be predicted, one or more estimated future frames that have their frame timestamps prior to or matching the prediction start time of the prediction cycle. Latency management system 100 may then exclude these estimated future frames from the estimated future frames being predicted in the prediction cycle. Accordingly, latency management system 100 may avoid predicting the estimated future frames that have their frame timestamps prior to or matching the prediction start time of the prediction cycle, because the contexts in the operating environment of robotic device 210 at the frame timestamps of these estimated future frames may already be contexts in the past when the future frame prediction performed in the prediction cycle is completed.

As an example, latency management system 100 or the prediction component (e.g., the machine learning model) of latency management system 100 may be implemented at MEC device 230 and MEC device 230 may receive the captured frames of video stream 400 from robotic device 210. Due to an unexpected increase in communication latency (e.g., network latency) for transmitting data from robotic device 210 to MEC device 230, one or more captured frames of video stream 400 may arrive at MEC device 230 relatively late. After arriving at MEC device 230, these captured frames may be included in a set of input frames to perform a future frame prediction in a prediction cycle. Because the prediction cycle may start at a prediction start time after these captured frames arrive at MEC device 230 relatively late, the prediction start time of the prediction cycle may be temporally close to the target future timestamp that is used to identify the predefined number (e.g., 15) of estimated future frames being predicted in the prediction cycle. Therefore, the predefined number (e.g., 15) of estimated future frames being predicted in the prediction cycle may include one or more particular estimated future frames that have their frame timestamps prior to or matching the prediction start time of the prediction cycle. In this case, latency management system 100 may remove the particular estimated future frames from the estimated future frames being predicted in the prediction cycle, because the contexts in the operating environment of robotic device 210 at the frame timestamps of the particular estimated future frames may already be contexts in the past when the future frame prediction performed in the prediction cycle is completed as described above.

In some embodiments, latency management system 100 may also exclude from the estimated future frames to be predicted in the prediction cycle one or more estimated future frames that are previously predicted in a previous prediction cycle. The previous prediction cycle may be performed before the prediction cycle and may have a prediction start time prior to the prediction start time of the prediction cycle as described herein.

As an example, latency management system 100 may identify, from the estimated future frames to be predicted in the prediction cycle, a first estimated future frame that has a same frame timestamp as a second estimated future frame predicted in the previous prediction cycle, Thus, the first estimated future frame and the second estimated future frame may correspond to the same future frame in video stream 400 and may have the same frame timestamp as a frame timestamp of the future frame. Accordingly, the first estimated future frame and the second estimated future frame may correspond to one another and may provide two predictions of the future context in the operating environment of robotic device 210 at the frame timestamp of the future frame. In this case, latency management system 100 may determine that the first estimated future frame is previously predicted (e.g., as the second estimated future frame) in the previous prediction cycle, and therefore may remove the first estimated future frame from the estimated future frames to be predicted in the prediction cycle. Accordingly, the estimated future frames to be predicted in the prediction cycle may not overlap with the estimated future frames already predicted in the previous prediction cycle. Thus, latency management system 100 may avoid predicting the same estimated future frames multiple times in different prediction cycles, and therefore computing resources of latency management system 100 may be preserved.

In other embodiments, the estimated future frames to be predicted in the prediction cycle may overlap with the estimated future frames already predicted in the previous prediction cycle. For example, the estimated future frames to be predicted in the prediction cycle may include one or more first estimated future frames that have the same frame timestamps as one or more second estimated future frames predicted in the previous prediction cycle. Thus, for a first estimated future frame to be predicted in the prediction cycle that has a same frame timestamp as a second estimated future frame predicted in the previous prediction cycle, the first estimated future frame and the second estimated future frame may correspond to the same future frame in video stream 400 and may provide two different predictions of a future context in the operating environment of robotic device 210 at the frame timestamp of the future frame.

As described herein, because the prediction cycle is performed subsequent to the previous prediction cycle, the set of input frames being used in the prediction cycle may include one or more captured frames of video stream 400 that are captured subsequent to the captured frames in the set of input frames being used in the previous prediction cycle. As the first estimated future frame may be predicted based on the one or more captured frames that are captured more recently, the first estimated future frame may provide a more accurate prediction of the future context in the operating environment of robotic device 210 at the frame timestamp of the future frame as compared to the second estimated future frame. For example, a predicted future context depicted in the first estimated future frame may be more similar to an actual context in the operating environment of robotic device 210 at the frame timestamp of the future frame as compared to a predicted future context depicted in the second estimated future frame. Accordingly, latency management system 100 may use the first estimated future frame instead of the second estimated future frame to determine a control input for robotic device 210 as described herein.

In some embodiments, after the set of input frames and the one or more estimated future frames to be predicted in the prediction cycle are identified as described above, latency management system 100 may predict the one or more estimated future frames based on the set of input frames using the machine learning model. For example, latency management system 100 may provide the set of input frames to the machine learning model, and the machine learning model may perform a frame prediction to generate content of the one or more estimated future frames based on the set of input frames. In some embodiments, the machine learning model may complete the frame prediction at a prediction end time and provide the one or more estimated future frames as its output.

In some embodiments, latency management system 100 may provide the one or more estimated future frames generated by the machine learning model to robotic device operator 220. For example, the machine learning model may be implemented on robotic device operator 220 and latency management system 100 may provide the estimated future frames from the machine learning model to another component (e.g., a user interface component, a robot control component, etc.) of robotic device operator 220 without transmitting the estimated future frames over the network. Additionally or alternatively, the machine learning model may be implemented on a computing device (e.g., robotic device 210, MEC device 230) that is located remotely from robotic device operator 220. In this case, latency management system 100 may transmit the estimated future frames from the computing device on which the machine learning model is implemented to robotic device operator 220 through the communication channel via the network.

In some embodiments, after the one or more estimated future frames generated by the machine learning model are provided to robotic device operator 220, these estimated future frames may be used at robotic device operator 220 to determine one or more control inputs for robotic device 210. However, in some situations, only a subset of the estimated future frames generated by the machine learning model may be provided to robotic device operator 220 to determine the control inputs for robotic device 210.

As an example, it may take a relatively long time for the machine learning model to generate the estimated future frames based on the set of input frames because the captured frames in the set of input frames are unexpectedly complicated. Therefore, when the machine learning model completes the frame prediction at the prediction end time, frame timestamps of one or more particular estimated future frames among the estimated future frames generated by the machine learning model may be passed, and thus the particular estimated future frames may have their frame timestamps prior to or matching the prediction end time. As a result, when the particular estimated future frames are provided to robotic device operator 220 to determine the control inputs for robotic device 210, the contexts in the operating environment of robotic device 210 at the frame timestamps of the particular estimated future frames may already be contexts in the past, and therefore the particular estimated future frames can no longer be used to determine control inputs for robotic device 210, or will be less effective if used.

In some embodiments, to address this situation, latency management system 100 may identify, from the estimated future frames generated by the machine learning model, a subset of estimated future frames based on the prediction end time. For example, latency management system 100 may identify one or more estimated future frames that have their frame timestamps subsequent to the prediction end time, and include these estimated future frames in the subset of estimated future frames. In some embodiments, latency management system 100 may provide the subset of estimated future frames to robotic device operator 220. The subset of estimated future frames may then be used at robotic device operator 220 to determine the control inputs for robotic device 210. Accordingly, the estimated future frames that have the frame timestamps prior to or matching the prediction end time may not be provided to robotic device operator 220 to determine the control inputs for robotic device 210.

As another example, the machine learning model of latency management system 100 may be implemented at a computing device (e.g., robotic device 210, MEC device 230, etc.) that is located remotely from robotic device operator 220. In this case, latency management system 100 may generate the estimated future frames at the computing device on which the machine learning model is implemented and transmit the estimated future frames from the computing device to robotic device operator 220 as described herein. In this example, due to an unexpected increase in the communication latency (e.g., the network latency) for transmitting data from the computing device to robotic device operator 220, the estimated future frames may arrive at robotic device operator 220 relatively late. Therefore, when the estimated future frames arrive at robotic device operator 220, frame timestamps of one or more particular estimated future frames among the estimated future frames may be passed, and thus the particular estimated future frames may have their frame timestamps prior to or matching an arrival time of the estimated future frames at robotic device operator 220. As a result, when the particular estimated future frames are used to determine one or more control inputs for robotic device 210 at robotic device operator 220, the contexts in the operating environment of robotic device 210 at the frame timestamps of the particular estimated future frames may already be contexts in the past, and therefore the particular estimated future frames can no longer be used to determine control inputs for robotic device 210, or will be less effective if used.

In some embodiments, to address this situation, latency management system 100 may compute an estimated arrival time of the estimated future frames at robotic device operator 220. For example, the estimated arrival time may be subsequent to the prediction end time by a time amount equal to the communication latency for transmitting data from the computing device (e.g., robotic device 210, MEC device 230, etc.) on which the machine learning model is implemented to robotic device operator 220. In some embodiments, latency management system 100 may identify, from the estimated future frames generated by the machine learning model, a subset of estimated future frames based on the estimated arrival time. For example, latency management system 100 may identify one or more estimated future frames that have their frame timestamps subsequent to the estimated arrival time, and include these estimated future frames in the subset of estimated future frames. In some embodiments, latency management system 100 may transmit the subset of estimated future frames to robotic device operator 220. The subset of estimated future frames may then be used at robotic device operator 220 to determine the control inputs for robotic device 210. Accordingly, the estimated future frames that have the frame timestamps prior to or matching the estimated arrival time may not be transmitted to robotic device operator 220 to determine the control inputs for robotic device 210.

In some embodiments, after one or more estimated future frames are provided to robotic device operator 220, latency management system 100 may use the one or more estimated future frames to determine one or more control inputs for robotic device 210 at robotic device operator 220 as described herein. In some embodiments, at a given time such as a current time when latency management system 100 determines a control input for robotic device 210, latency management system 100 may identify an estimated future frame from the one or more estimated future frames based on the current time and the communication latency for transmitting data from robotic device operator 220 to robotic device 210. Latency management system 100 may then use the estimated future frame to determine a control input for robotic device 210.

In some embodiments, to identify the estimated future frame being used to determine the control input for robotic device 210, latency management system 100 may select, from the one or more estimated future frames provided to robotic device operator 220, an estimated future frame that has a frame timestamp subsequent to the current time by a time amount equal to the communication latency for transmitting data from robotic device operator 220 to robotic device 210. Accordingly, the estimated future frame may have the frame timestamp matching an approximate time at which the control input being determined would likely arrive at robotic device 210 and may depict a predicted future context in the operating environment of robotic device 210 at that approximate time.

Alternatively, in other embodiments, latency management system 100 may compute a frame utilization time for the each estimated future frame provided to robotic device operator 220. The frame utilization time may indicate a point in time at which the estimated future frame may be used to determine a control input for robotic device 210. In some embodiments, the frame utilization time may be prior to the frame timestamp of the estimated future frame by a time amount equal to the communication latency for transmitting data from robotic device operator 220 to robotic device 210. When latency management system 100 determines a control input for robotic device 210 at a given time such as a current time, latency management system 100 may select, from the one or more estimated future frames provided to robotic device operator 220, an estimated future frame that has its frame utilization time matching the current time. Accordingly, the estimated future frame may have the frame timestamp subsequent to the current time by the time amount equal to the communication latency for transmitting data from robotic device operator 220 to robotic device 210. Thus, the estimated future frame may have the frame timestamp matching the approximate time at which the control input being determined would likely arrive at robotic device 210 and may depict a predicted future context in the operating environment of robotic device 210 at that approximate time.

Figure 6:
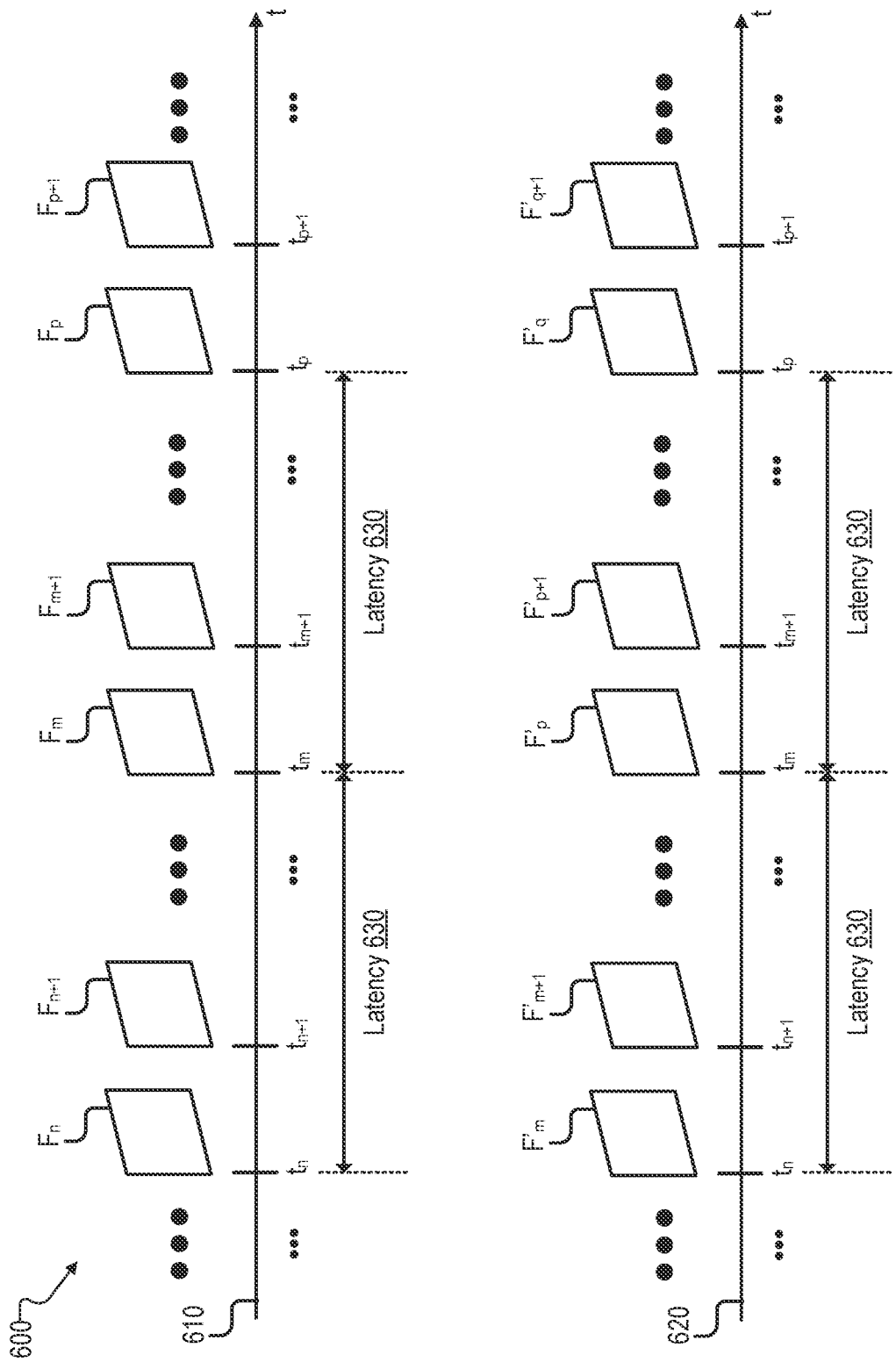
FIG. 6 shows an illustrative diagram depicting estimated future frames being used to determine control inputs for a robotic device according to embodiments described herein.

As an example, FIG. 6 shows a diagram 600 depicting the estimated future frames that are used to determine the control inputs for robotic device 210. As depicted in FIG. 6, diagram 600 may include a timeline 610 and a timeline 620. Timeline 610 may illustrate a timeline of video frames in video stream 400 and may include multiple points in time in which each point in time may indicate a frame timestamp of a video frame in video stream 400. On the other hand, timeline 620 may illustrate a timeline of estimated future frames being used to determine control inputs for robotic device 210. Timeline 620 may include the same points in time as timeline 610 and may indicate an estimated future frame being used to determine a control input for robotic device 210 at each point in time.

As depicted in FIG. 6, at a particular point in time, latency management system 100 may use an estimated future frame corresponding to a future frame in video stream 400 to determine a control input for robotic device 210. The estimated future frame may have the same frame timestamp as the future frame and that frame timestamp may be subsequent to the particular point in time by a time amount equal to a latency 630 as depicted in FIG. 6. In some embodiments, latency 630 may be the communication latency for transmitting data from robotic device operator 220 to robotic device 210.

For example, as depicted in FIG. 6, at a point in time $t_n$, corresponding to a frame timestamp $t_n$ of a video frame $F_n$ in video stream 400, latency management system 100 may use an estimated future frame $F'_m$ corresponding to a future frame $F_m$ in video stream 400 to determine a control input for robotic device 210. The estimated future frame $F'_m$ and the future frame $F_m$ may have the same frame timestamp $t_m$ that is subsequent to the point in time $t_n$ by a time amount equal to latency 630. As described above, latency 630 may be the communication latency for transmitting data from robotic device operator 220 to robotic device 210. Similarly, at a point in time $t_m$ corresponding to the frame timestamp $t_m$ of the video frame $F_m$ in video stream 400, latency management system 100 may use an estimated future frame $F'_p$ corresponding to a future frame $F_p$ in video stream 400 to determine a control input for robotic device 210. The estimated future frame $F'_p$ and the future frame $F_p$ may have the same frame timestamp $t_p$ that is subsequent to the point in time $t_m$ by a time amount equal to latency 630. As described above, latency 630 may be the communication latency for transmitting data from robotic device operator 220 to robotic device 210.

Thus, an estimated future frame (e.g., the estimated future frame $F'_m$) that depicts a predicted future context in the operating environment of robotic device 210 at a frame timestamp (e.g., the frame timestamp $t_m$)) of the estimated future frame may be used to determine a control input for robotic device 210. Such determination of the control input based on the estimated future frame may be performed at the frame utilization time (e.g., the point in time $t_n$) of the estimated future frame that is prior to the frame timestamp (e.g., frame timestamp $t_m$) of the estimated future frame by the time amount equal to the communication latency for transmitting data from robotic device operator 220 to robotic device 210 as described above.

In some embodiments, instead of determining the control input for robotic device 210 at robotic device operator 220 as described above, latency management system 100 may determine the control input for robotic device 210 at a different computing device of system 200. For example, latency management system 100 may determine the control input for robotic device 210 at a computing device (e.g., MEC device 230) where the estimated future frames are predicted by the machine learning model. In this case, when determining a control input for robotic device 210 at the computing device (e.g., MEC device 230) and at a given time such as a current time, latency management system 100 may identify, from the one or more estimated future frames generated by machine learning model, an estimated future frame that has a frame timestamp subsequent to the current time by a time amount equal to a sum of the communication latency for transmitting data from the computing device (e.g., MEC device 230) to robotic device operator 220 and the communication latency for transmitting data from robotic device operator 220 to robotic device 210. The estimated future frame may then be used to determine a control input for robotic device 210 at the computing device (e.g., MEC device 230). In this case, the control input determined at the computing device may be transmitted from the computing device to robotic device operator 220 (e.g., to obtain a user approval) and then be transmitted from robotic device operator 220 to robotic device 210. Other implementations for identifying an estimated future frame to be used in determining a control input for robotic device 210 are also possible and contemplated.

In some embodiments, after the estimated future frame is identified, latency management system 100 may determine a control input for robotic device 210 based on the estimated future frame.

For example, the control input for robotic device 210 may be determined at robotic device operator 220 and at a given time such as a current time. When determining the control input for robotic device 210, latency management system 100 may generate the control input at the current time based on the estimated future frame. In some embodiments, the control input may instruct robotic device 210 to perform an action (e.g., move 10 cm to the left, rotate 30° clockwise, etc.) in response to the predicted future context depicted in the estimated future frame. As described herein, the estimated future frame may depict the predicted future context in the operating environment of robotic device 210 at its frame timestamp, which matches the approximate time when the control input would likely arrive at robotic device 210. Therefore, the control input generated based on the estimated future frame may be suitable for the future context in the operating environment of robotic device 210 at the time robotic device 210 would receive the control input and perform the action specified by the control input. As a result, the accuracy in controlling robotic device 210 with the control input may increase.

In some embodiments, after the control input is generated, latency management system 100 may transmit the control input from robotic device operator 220 to robotic device 210. When receiving the control input from robotic device operator 220, robotic device 210 may perform the action specified in the control input to carry out a task (e.g., crossing the street to deliver an item, grabbing an item on the conveyor belt) in the operating environment of robotic device 210.

In some embodiments, instead of or in addition to generating the control input for robotic device 210 based on the estimated future frame, latency management system 100 may provide the estimated future frame for display to a user of robotic device operator 220. For example, when determining the control input for robotic device 210 at robotic device operator 220 and at a given time such as a current time, latency management system 100 may provide the estimated future frame to a user interface component of robotic device operator 220 and the user interface component may display the estimated future frame to the user at the current time.

In some embodiments, latency management system 100 may receive a control input from the user in response to the estimated future frame presented to the user. For example, the user may determine the control input (e.g., move 15 cm to the right, rotate 45° counterclockwise, etc.) for robotic device 210 based on the predicted future context depicted in the estimated future frame and provide the control input to robotic device operator 220 via the user interface component. As described herein, the estimated future frame may depict the predicted future context in the operating environment of robotic device 210 at its frame timestamp, which matches the approximate time when the control input would likely arrive at robotic device 210. Therefore, the control input that the user determines for robotic device 210 based on the estimated future frame may be suitable for the future context in the operating environment of robotic device 210 at the time robotic device 210 would receive the control input and perform the action specified by the control input.

As a result, the accuracy in controlling robotic device 210 with the control input may increase.

In some embodiments, after receiving the control input from the user, latency management system 100 may transmit the control input from robotic device operator 220 to robotic device 210. When receiving the control input from robotic device operator 220, robotic device 210 may perform the action specified in the control input to carry out the task in the operating environment of robotic device 210 as described above.

In some embodiments, when latency management system 100 determines a control input for robotic device 210, multiple estimated future frames may be qualified to be used in such determination. These estimated future frames may be generated in different prediction cycles and may have the same frame timestamp. For example, these estimated future frames may have the same frame timestamp that is subsequent to a given time (e.g., a current time at which the control input is determined) by a time amount equal to the communication latency for transmitting data from robotic device operator 220 to robotic device 210 as described herein. Accordingly, these estimated future frames may correspond to the same future frame of video stream 400 that has the frame timestamp, and may provide different predictions of a future context in the operating environment of robotic device 210 at the frame timestamp.

In some embodiments, among the estimated future frames that correspond to the future frame, a first estimated future frame may be generated in a first prediction cycle and a second estimated future frame may be generated in a second prediction cycle that is performed subsequent to the first prediction cycle. Because the second prediction cycle is performed subsequent to the first prediction cycle, the set of input frames being used in the second prediction cycle may include one or more captured frames of video stream 400 that are captured subsequent to the captured frames in the set of input frames being used in the first prediction cycle. Accordingly, as the second estimated future frame may be predicted in the second prediction cycle based on the one or more captured frames that are captured more recently, the second estimated future frame may provide a more accurate prediction of the future context in the operating environment of robotic device 210 at the frame timestamp of the future frame as compared to the first estimated future frame. For example, a predicted future context depicted in the second estimated future frame may be more similar to an actual context in the operating environment of robotic device 210 at the frame timestamp of the future frame as compared to a predicted future context depicted in the first estimated future frame. Therefore, latency management system 100 may use the second estimated future frame instead of the first estimated future frame to determine a control input for robotic device 210.

For example, when determining a control input for robotic device 210 at robotic device operator 220 and at a given time such as a current time, latency management system 100 may determine a first estimated future frame from one or more estimated future frames provided to robotic device operator 220 that are generated in a first prediction cycle. As described herein, latency management system 100 may determine the first estimated future frame from the one or more estimated future frames based at least on the current time. For example, the first estimated future frame may have a frame timestamp that is subsequent to the current time by a time amount equal to the communication latency for transmitting data from robotic device operator 220 to robotic device 210 as described herein.

In some embodiments, latency management system 100 may determine that the first estimated future frame has the same frame timestamp as a second estimated future frame included in one or more additional estimated future frames provided to robotic device operator 220. The one or more additional estimated future frames may be generated in a second prediction cycle that is performed subsequent to the first prediction cycle. Accordingly, the one or more additional estimated future frames (including the second estimated future frame) may be predicted based on one more captured frames of video stream 400 that are captured more recently than the captured frames being used to predict the one or more estimated future frames (including the first estimated future frame) in the first prediction cycle as described above.

Thus, because the first estimated future frame and the second estimated future frame have the same frame timestamp, the first estimated future frame and the second estimated future frame may correspond to the same future frame that has the frame timestamp and may provide different predictions of a future context in the operating environment of robotic device 210 at the frame timestamp as described above. In addition, because the second estimated future frame may be predicted based on the captured frames that are captured more recently, the second estimated future frame may provide a more accurate prediction of the future context in the operating environment of robotic device 210 at the frame timestamp as compared to the first estimated future frame as described above. Accordingly, latency management system 100 may utilize the second estimated future frame instead of the first estimated future frame in providing a control input for robotic device 210. For example, latency management system 100 may determine the control input (e.g., generate the control input and/or obtain the control input from the user) at the current time and based on the second estimated future frame in the manner described herein. Latency management system 100 may then transmit the control input to robotic device 210 to control the action performed by robotic device 210.

Accordingly, among the estimated future frames provided to robotic device operator 220 that are generated in different prediction cycles and have the same frame timestamp, latency management system 100 may use the estimated future frame generated in a prediction cycle that is performed most recently to determine a control input for robotic device 210. The prediction cycle that is performed most recently may have the prediction start time subsequent to the prediction start time of other prediction cycles among the multiple prediction cycles during which the estimated future frames having the frame timestamp are generated.

In addition, when generating estimated future frames in a prediction cycle, latency management system 100 may predict the future contexts in the operating environment of robotic device 210 far enough into the future to compensate for the communication latency of the communication channel as described herein. The communication latency of the communication channel being used may be the highest communication latency of the communication channel measured in the latency monitoring window. Because latency management system 100 may compensate for the highest communication latency of the communication channel, when estimated future frames predicted in a prediction cycle are used to determine control inputs for robotic device 210, estimated future frames predicted in a next prediction cycle may likely be provided to robotic device operator 220 and available at robotic device operator 220. Accordingly, if the estimated future frames generated in the prediction cycle and the estimated future frames generated in the next prediction cycle overlap, latency management system 100 may use an estimated future frame generated in the next prediction cycle and not a corresponding estimated future frame generated in the prediction cycle to determine a control input for robotic device 210 as described above.

Moreover, because the estimated future frames predicted in the next prediction cycle may be available at robotic device operator 220 when the estimated future frames predicted in the prediction cycle are used to determine control inputs for robotic device 210, latency management system 100 may continue determining control inputs for robotic device 210 using the estimated future frames predicted in the next prediction cycle without any interruption. As a result, multiple control inputs may be provided to robotic device 210 without any interruption, and therefore a performance of robotic device 210 in carrying out the task may be improved.

In some embodiments, a control input provided to robotic device 210 may specify an action performed by robotic device 210 as described herein. In some embodiments, the action performed by robotic device 210 based on the control input may impact captured frames in video stream 400 that are captured subsequent to the action. For example, the control input may instruct robotic device 210 to move to the left towards an object in the operating environment of robotic device 210, and therefore the object may appear bigger in one or more captured images that are captured by camera 212 subsequent to such movement. Accordingly, in some embodiments, latency management system 100 may use the control input as an additional input in one or more future frame predictions that are performed after the control input is determined for robotic device 210.

As an example, latency management system 100 may utilize an estimated future frame from one or more estimated future frames generated in a prediction cycle to provide a control input for robotic device 210 as described herein. The control input may be transmitted to robotic device 210 and may specify an action for robotic device 210 to perform in the operating environment of robotic device 210 as described herein. In some embodiments, after the control input is determined and/or transmitted to robotic device 210, latency management system 100 may provide the control input to the machine learning model. For example, latency management system 100 may transmit the control input from robotic device operator 220 to the computing device (e.g., MEC device 230) on which the machine learning model is implemented. The machine learning model may use the control input together with a set of input frames to predict one or more additional estimated future frames for video stream 400 in a subsequent prediction cycle such as a next prediction cycle of the prediction cycle.

Because the action performed by robotic device 210 based on the control input may impact the captured frames in video stream 400 that are captured subsequent to the action as described above, using the control input as an additional input for the machine learning model in the subsequent prediction cycle may improve the accuracy of the future frame prediction performed in the subsequent prediction cycle. For example, a predicted future context depicted in an estimated future frame generated in the subsequent prediction cycle may be more similar to an actual context of the operating environment of robotic device 210 at a frame timestamp of the estimated future frame, as compared to an estimated future frame generated by the machine learning model without using the control input as an additional input for the machine learning model.

In some embodiments, the estimated future frames generated by latency management system 100 may be used to address a package loss associated with video stream 400. As an example, the captured frames of video stream 400 that are captured by camera 212 may be presented to a user at a particular computing device (e.g., MEC device 230, robotic device operator 220, etc.) of system 200. Due to a decrease in network quality and/or an increase in communication latency (e.g., network latency), a particular captured frame of video stream 400 may get lost during its transmission from camera 212 and/or robotic device 210 to the particular computing device, or the particular captured frame may arrive at the particular computing device relatively late. In this case, an estimated future frame generated by latency management system 100 using the machine learning model may be presented to the user instead of the particular captured frame. The estimated future frame may have the same frame timestamp as the particular captured frame and may depict a predicted context in the operating environment of robotic device 210 at the frame timestamp. Accordingly, the video stream 400 may be presented to the user without any disruption, despite the frame loss or the late arrival of the particular captured frame.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

Figure 7:
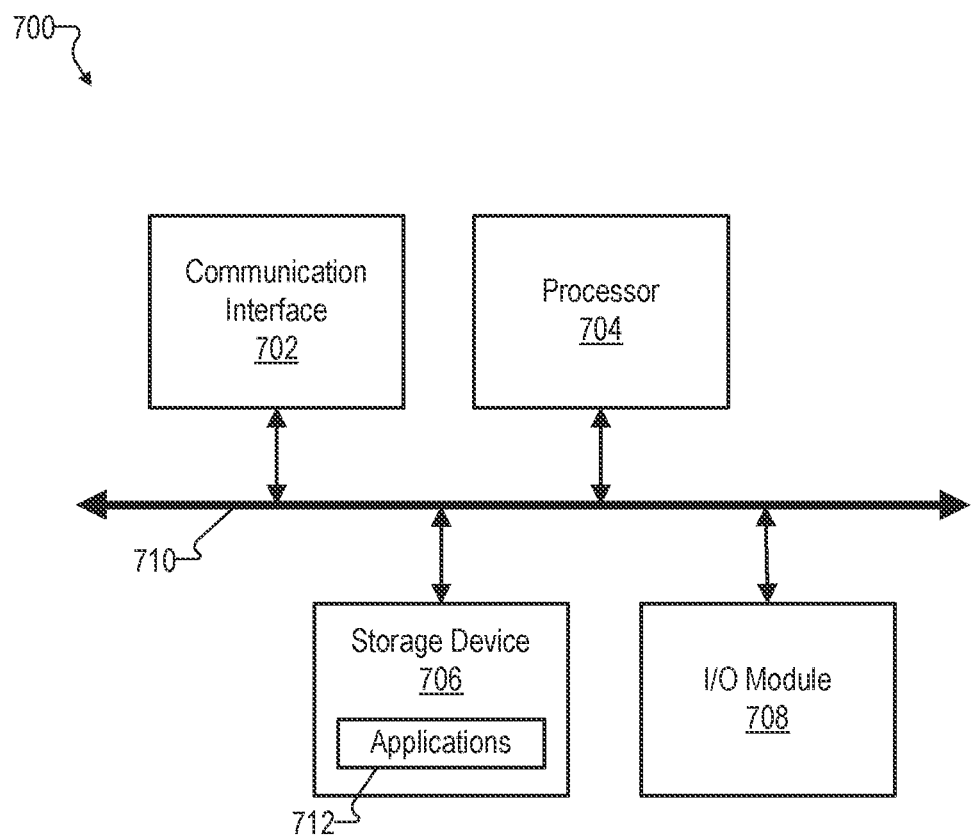
FIG. 7 shows an illustrative computing device according to embodiments described herein.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read, FIG. 7 shows an illustrative computing device 700 that may be specifically configured to perform one or more of the processes described herein. For example, computing device 700 may include or implement (or partially implement) a latency management system such as latency management system 100, a robotic device such as robotic device 210, a network device that has computational capabilities such as MEG device 230, a robotic device operator such as robotic device operator 220, and/or any other computing devices described herein.

As shown in FIG. 7, computing device 700 may include a communication interface 702, a processor 704, a storage device 706, and an input/output ("I/O") module 708 communicatively connected via a communication infrastructure 710. While an illustrative computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 such as a latency management application or other computer-executable instructions such as instructions being stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with processor 104 of latency management system 100. Likewise, memory 102 of latency management system 100 may be implemented by or within storage device 706.

FIG. 8 illustrates an example environment 800, in which one or more embodiments may be implemented. For example, environment 800 may correspond to network 240 of system 200 in which system 200 may implement latency management system 100 that manages latency to control robotic device 210 remotely as described herein. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include user equipment ("UE") 801, radio access network ("RAN") 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as orchestration platform 101.

As noted above, some or all of environment 800 may be implemented as a virtualized environment, in which one or more elements of environment 800 (e.g., AMF 815, UPF/PGW-U 835, SMF/PGW-C 820, etc.) may be implemented by one or more nodes of a virtualized environment. In some embodiments, routing elements and/or other network elements not specifically shown in FIG. 8 may be implemented by one or more nodes of the virtualized environment. In some embodiments, as discussed above, orchestration platform 101 may configure, provision, install, remove, etc. particular nodes from hardware resources that implement the nodes, and/or may install containers (e.g., which include functionality of one or more VNFs, Cloud-native Network Functions ("CNFs"), etc.) on such nodes.

The example shown in FIG. 8 illustrates one instance of each network component or function (e.g., one instance of SMF/PGVV-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835. UDM/HSS 840, and/or AUSF 845, while another slice may include a second instance of SMF/PGW-C 820, PCF/PCRF 825, UPF/PGW-U 835, UDM/HSS 840, and/or AUSF 845). The different shoes may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 812 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, VNFs, CNFs, etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 801.

DN 850 may include one or more wired and/or wireless networks. For example, DN 850 may include an IP-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
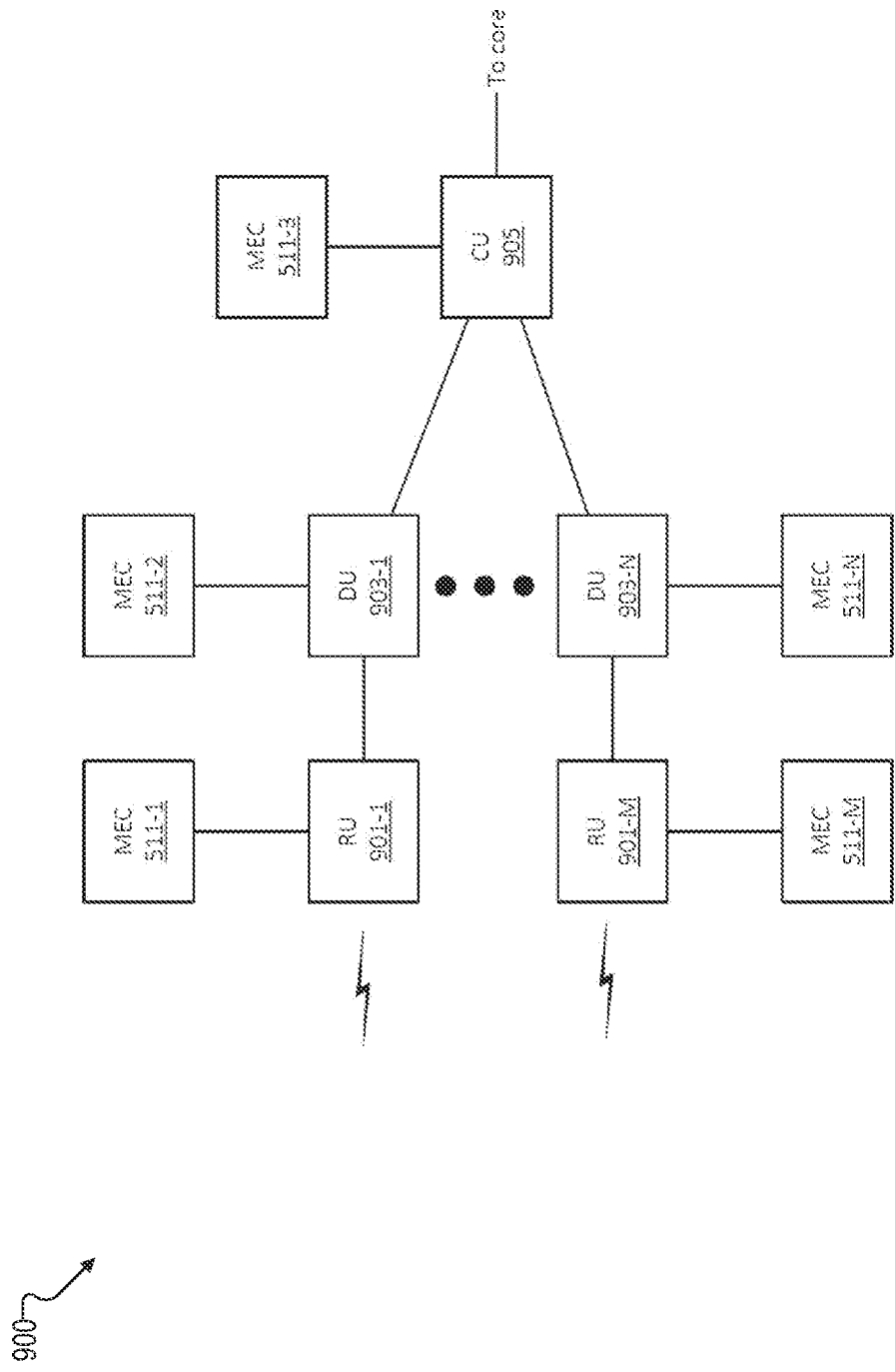
FIG. 9 shows an illustrative radio access network environment according to embodiments described herein.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810) In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N(referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more radio frequency ("RF") transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as "MECs" 511. For example, RU 901-1 may be communicatively coupled to MEC 511-1, RU 901-M may be communicatively coupled to MEC 511-M, DU 903-1 may be communicatively coupled to MEC 511-2, DU 903-N may be communicatively coupled to MEC 511-N, CU 905 may be communicatively coupled to MEC 511-3, and so on. MECs 511 may include hardware resources (e.g., configurable or provisionable hardware resources) that may be configured to provide services and/or otherwise process traffic to and/or from UE 801, via a respective RU 901. In some embodiments, one or more MECs 511 may implement MEC device 230 and/or perform one or more functionalities of MEC device 230 described herein.

For example, RU 901-1 may route some traffic, from UE 801, to MEC 511-1 instead of to a core network via DU 903 and CU 905, MEC 511-1 may process the traffic, perform one or more computations based on the received traffic, and may provide traffic to UE 801 via RU 901-1, In some embodiments, MEC 511 may include, and/or may implement, some or all of the functionality described above with respect to orchestration platform 101, AF 830, UPF 835, and/or one or more other devices, systems, VNFs, CNFs, etc. In this manner, ultra-low latency services may be provided to UE 801, as traffic does not need to traverse DU 903, CU 905, and an intervening backhaul network between RAN environment 900 and the core network.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a latency management system, a sequence of captured frames in a video stream of an operating environment associated with a robotic device;
    monitoring, by the latency management system, a communication latency of a communication channel between the robotic device and a robotic device operator;
    predicting, by the latency management system, one or more estimated future frames associated with the video stream based on the sequence of captured frames and the communication latency;
    providing, by the latency management system, the one or more estimated future frames to the robotic device operator;
    utilizing, by the latency management system, an estimated future frame from the one or more estimated future frames in providing a control input for the robotic device; and
    providing, by the latency management system, the control input to a machine learning model, the machine learning model being configured to use the control input in predicting one or more additional estimated future frames for the video stream in a subsequent prediction cycle.

2. The method of claim 1, further comprising:
    identifying, by the latency management system and at the robotic device operator, the estimated future frame from the one or more estimated future frames based on a current time and a latency for transmitting data from the robotic device operator to the robotic device;
    generating, by the latency management system, the control input at the current time based on the estimated future frame; and
    transmitting, by the latency management system, the control input from the robotic device operator to the robotic device.

3. The method of claim 1, further comprising:
    identifying, by the latency management system and at the robotic device operator, the estimated future frame from the one or more estimated future frames based on a current time and a latency for transmitting data from the robotic device operator to the robotic device;
    providing, by the latency management system, the estimated future frame for display at the current time to a user of the robotic device operator;
    receiving, by the latency management system, the control input from the user in response to the estimated future frame; and
    transmitting, by the latency management system, the control input from the robotic device operator to the robotic device.

4. The method of claim 1, wherein the predicting of the one or more estimated future frames associated with the video stream includes:
    determining a target future timestamp based on the communication latency of the communication channel and an estimated processing time for predicting a predefined number of estimated future frames; and
    identifying the one or more estimated future frames based on the target future timestamp.

5. The method of claim 4, wherein the predicting of the one or more estimated future frames associated with the video stream includes:
    excluding, from the one or more estimated future frames being predicted, a particular estimated future frame that has a frame timestamp prior to a prediction start time.

6. The method of claim 4, wherein the predicting of the one or more estimated future frames associated with the video stream includes:
    excluding, from the one or more estimated future frames being predicted, a particular estimated future frame that is previously predicted in a previous prediction cycle.

7. The method of claim 1, wherein:
    the communication latency of the communication channel includes a first latency for transmitting data from the robotic device to the robotic device operator and a second latency for transmitting the data from the robotic device operator to the robotic device; and
    the communication latency is a highest communication latency of the communication channel during a latency monitoring window.

8. The method of claim 1, wherein the predicting of the one or more estimated future frames associated with the video stream includes:
    identifying, from the sequence of captured frames, a set of input frames including a predefined number of sequential captured frames that are most recent to a current time; and
    predicting the one or more estimated future frames based on the set of input frames using the machine learning model.

9. The method of claim 1, wherein the providing of the one or more estimated future frames to the robotic device operator includes:
    identifying, from the one or more estimated future frames, a subset of estimated future frames based on a prediction end time; and
    providing the subset of estimated future frames to the robotic device operator.

10. The method of claim 1, wherein the providing of the one or more estimated future frames to the robotic device operator includes:
    computing an estimated arrival time of the one or more estimated future frames at the robotic device operator;
    identifying, from the one or more estimated future frames, a subset of estimated future frames based on the estimated arrival time; and
    providing the subset of estimated future frames to the robotic device operator.

11. The method of claim 1, further comprising:
    identifying, by the latency management system and at the robotic device operator, the estimated future frame from the one or more estimated future frames based at least on a current time;
    determining, by the latency management system, that the estimated future frame has a same frame timestamp as a different estimated future frame included in one or more different estimated future frames provided to the robotic device operator that are predicted prior to the one or more estimated future frames; and
    utilizing, by the latency management system, the estimated future frame in providing the control input for the robotic device at the current time.

12. The method of claim 1, wherein:
    the latency management system is implemented by one or more of the robotic device, the robotic device operator, or a computing device through which data is transmitted from the robotic device to the robotic device operator.

13. The method of claim 12, wherein:
the computing device is a multi-access edge computing (MEC) device.

14. A system comprising a processor configured to:
receive a sequence of captured frames in a video stream of an operating environment associated with a robotic device;
monitor a communication latency of a communication channel between the robotic device and a robotic device operator;
predict one or more estimated future frames associated with the video stream based on the sequence of captured frames and the communication latency;
provide the one or more estimated future frames to the robotic device operator;
utilize an estimated future frame from the one or more estimated future frames in providing a control input for the robotic device; and
provide the control input to a machine learning model, the machine learning model being configured to use the control input in predicting one or more additional estimated future frames for the video stream in a subsequent prediction cycle.

15. The system of claim 14, wherein the processor is further configured to:
identify, at the robotic device operator, the estimated future frame from the one or more estimated future frames based on a current time and a latency for transmitting data from the robotic device operator to the robotic device;
generate the control input at the current time based on the estimated future frame; and
transmit the control input from the robotic device operator to the robotic device.

16. The system of claim 14, wherein the processor is further configured to:
identify, at the robotic device operator, the estimated future frame from the one or more estimated future frames based on a current time and a latency for transmitting data from the robotic device operator to the robotic device;
provide the estimated future frame for display at the current time to a user of the robotic device operator;
receive the control input from the user in response to the estimated future frame; and
transmit the control input from the robotic device operator to the robotic device.

17. The system of claim 14, wherein the predicting of the one or more estimated future frames associated with the video stream includes:
determining a target future timestamp based on the communication latency of the communication channel and an estimated processing time for predicting a predefined number of estimated future frames; and
identifying the one or more estimated future frames based on the target future timestamp.

18. The system of claim 14, wherein the predicting of the one or more estimated future frames associated with the video stream includes:
identifying, from the sequence of captured frames, a set of input frames including a predefined number of sequential captured frames that are most recent to a current time; and
predicting the one or more estimated future frames based on the set of input frames using the machine learning model.

19. A non-transitory computer-readable medium storing instructions that, when executed, direct a processor of a latency management system to:
receive a sequence of captured frames in a video stream of an operating environment associated with a robotic device;
monitor a communication latency of a communication channel between the robotic device and a robotic device operator;
predict one or more estimated future frames associated with the video stream based on the sequence of captured frames and the communication latency;
provide the one or more estimated future frames to the robotic device operator;
utilize an estimated future frame from the one or more estimated future frames in providing a control input for the robotic device; and
provide the control input to a machine learning model, the machine learning model being configured to use the control input in predicting one or more additional estimated future frames for the video stream in a subsequent prediction cycle.

* * * * *